US012739227B2

(12) United States Patent
Asveren et al.

(10) Patent No.: US 12,739,227 B2
(45) Date of Patent: *Sep. 15, 2026

(54) METHODS, SYSTEMS AND APPARATUS FOR HANDLING MAINTENANCE EVENTS IN PUBLIC CLOUD DEPLOYMENTS

(71) Applicant: Ribbon Communications Operating Company, Inc., Westford, MA (US)

(72) Inventors: Tolga Asveren, Bordentown, NJ (US); Amol Sudhir Gogate, Pune (IN); Shivakumar Venkataraman, Bengaluru (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 126 days.

This patent is subject to a terminal disclaimer.

(21) Appl. No.: 18/965,635

(22) Filed: Dec. 2, 2024

(65) Prior Publication Data

US 2025/0097194 A1 Mar. 20, 2025

Related U.S. Application Data

(63) Continuation of application No. 18/213,371, filed on Jun. 23, 2023, now Pat. No. 12,160,405.

(30) Foreign Application Priority Data

Jul. 11, 2022 (IN) ............................ 202241039806

(51) Int. Cl.
*H04L 61/5076* (2022.01)
*G06F 9/455* (2018.01)
(Continued)

(52) U.S. Cl.
CPC ...... *H04L 61/5076* (2022.05); *G06F 9/45558* (2013.01); *H04L 41/082* (2013.01);
(Continued)

(58) Field of Classification Search
None
See application file for complete search history.

(56) References Cited

U.S. PATENT DOCUMENTS 7,743,137 B2 * 6/2010 Sarwono ............ H04L 41/0686 714/39
8,516,047 B2 * 8/2013 Castanho ............ G06Q 10/107 705/13

(Continued)

FOREIGN PATENT DOCUMENTS

WO WO-2021262058 A1 * 12/2021 ......... G06F 9/45558

*Primary Examiner* — Sandarva Khanal
(74) *Attorney, Agent, or Firm* — Straub & Straub; Stephen T. Straub; Michael P. Straub

(57) ABSTRACT

An exemplary embodiment of implementing a communications service in a Public Cloud system comprises the steps of: (i) registering, by a Maintenance Management application of the communications service, to receive notifications for maintenance events scheduled for virtual machines and/or servers of the Public Cloud system being used to implement the communications service; (ii) receiving, by the Maintenance Management application, a maintenance notification indicating a first virtual machine is to undergo a maintenance event; (iii) determining, by the Maintenance Management application, public IP addresses being hosted by a first Packet Front End application executing on the first virtual machine; and (iv) notifying session control applications of the communications service to drain the determined public IP addresses being hosted by the first Packet Front End application.

20 Claims, 9 Drawing Sheets

(51) Int. Cl.

| | |
|---|---|
| ***H04L 41/082*** | (2022.01) |
| ***H04L 61/5007*** | (2022.01) |
| ***H04L 61/5038*** | (2022.01) |
| ***H04L 65/10*** | (2022.01) |
| ***H04L 65/1059*** | (2022.01) |
| ***H04L 65/1104*** | (2022.01) |

(52) U.S. Cl.

CPC ...... *H04L 61/5007* (2022.05); *H04L 61/5038* (2022.05); *H04L 65/1013* (2013.01); *H04L 65/1059* (2013.01); *H04L 65/1104* (2022.05); *G06F 2009/45595* (2013.01)

(56) References Cited

U.S. PATENT DOCUMENTS

| | | | | |
|---|---|---|---|---|
| 11,113,158 | B2 * | 9/2021 | Alluboyina | G06F 11/1464 |
| 11,526,405 | B1 * | 12/2022 | Fisher | G06F 11/1435 |
| 2023/0393927 | A1 * | 12/2023 | Karr | G06F 11/0793 |

* cited by examiner

METHODS, SYSTEMS AND APPARATUS FOR HANDLING MAINTENANCE EVENTS IN PUBLIC CLOUD DEPLOYMENTS

RELATED APPLICATIONS

The present application is a continuation of U.S. patent application Ser. No. 18/213,371 filed on Jun. 23, 2023 which published as U.S. Patent Application Publication No. US 2024-0015136 A1 on Jan. 11, 2024 and which claims the benefit of Indian Provisional Patent Application Serial Number: 202241039806 which was filed on Jul. 11, 2022. The aforementioned patent applications and publications are hereby expressly incorporated by reference in their entirety.

FIELD OF INVENTION

The present invention relates to methods, systems and apparatus for handling maintenance events in Public Clouds with no or minimal service impact. The present invention also relates to methods, systems and apparatus for moving Public Internet Protocol (IP) addresses between instances in Public Clouds with no or minimal impact to applications and/or service logic.

BACKGROUND

Use of Public Clouds for real time communication applications is proliferating due to several factors, e.g., elimination of need to design/maintain a data center, elastic usage of hardware resources, case of access to a plethora of various tools, etc. Public Cloud deployments also have certain characteristics which are challenging for real time communications. One of the most prominent of such characteristics is the time required to move a Public Internet Protocol (IP) address to a new instance of an application which, for example, would be needed after a standby instance takes over the responsibilities of the failed instance. The standby and failed instances may be, and in some embodiments are, for a real time application and/or service. Due to timing requirements of real time applications and/or services, current delays experienced for such an operation in Public Clouds is far from being acceptable. One common scenario where a switchover between active/standby instances is needed is when Public Cloud infrastructure and/or Public Cloud system elements/equipment terminates a virtual machine (VM) for example due to maintenance (e.g., to address potential problems and/or update the system such as Operating System (OS) upgrades, driver updates, anticipated hardware failure(s), etc.)

From the foregoing, it should be understood, that there is a need for new and/or improved methods, systems and apparatus for overcoming the technological problem of how to effectively and efficiently handle maintenance events in Public Clouds with no or minimal service impact. It should also be understood from the foregoing, that there is a need for new and/or improved methods, systems, and apparatus that overcome the technological problem of how to effectively and efficiently allocate and/or move Public Internet Protocol addresses being used by real time applications without impacting and/or reducing the impact on service logic for certain scenarios such as for switchover between instances of active and standby real time applications prior to maintenance events.

SUMMARY

The present invention provides new and/or improved methods, systems and apparatus for handling maintenance events in Public Cloud Deployments with no or minimal service impact. The present invention also provides new and/or improved methods, systems and apparatus for moving Public Internet Protocol (IP) addresses between instances in Public Cloud systems with no or minimal impact to applications and/or service logic. One or more embodiments of the present invention provide new and/or improved methods, systems and apparatus that address one or more of the various technical problems described above. Various embodiments of the present invention overcome the problem of where a switchover from a first instance or application (e.g., active application) of a real time communications service to a second instance or application of the real time communications service (e.g., standby instance or application) is needed when the Public Cloud Infrastructure terminates a virtual machine due to maintenance but the timing requirements to perform the switchover in real time are unacceptable and cause service interruptions.

An exemplary method of implementing a communications service in a Public Cloud system in accordance with an embodiment of the present invention includes the steps of: (i) registering, by a Maintenance Management application of the communications service, to receive notifications for maintenance events scheduled for virtual machines and/or servers of the Public Cloud system being used to implement the communications service; (ii) receiving, by the Maintenance Management application, a maintenance notification indicating a first virtual machine is to undergo a maintenance event; (iii) determining, by the Maintenance Management application, public IP addresses being hosted by a first Packet Front End application executing on the first virtual machine; and notifying session control applications of the communications service to drain the determined public IP addresses being hosted by the first Packet Front End application.

In some embodiments, the method further comprises that in response to receiving a notification to drain a public IP address corresponding to a media Internet Protocol address, each session control application of the real time communications service stops using the public IP address in Session Description Protocol offer and answer messages for new dialogs; and in response to receiving a notification to drain a public IP address corresponding to a signaling Internet Protocol address, each session control application of the real time communications service upon receiving an initial dialog request (e.g., initial INVITE or out-of-dialog request, e.g., PUBLISH) from a signaling IP address for which a drain notification was received, populates a Contact header of a reply message with a signaling IP address for which no draining notification has been received.

In some embodiments, the method further comprises that each session control application of the real time communications service determines when a public IP address for which a drain notification has been received is no longer being used by the session control application; and in response to determining that a public IP address for which a drain notification has been received is no longer in use at the session control application, sending a notification to the maintenance management application that the public IP address is no longer in use at the session control application.

In various embodiments, the method further comprises the steps of: determining by the maintenance management application when all public IP addresses hosted by the first Packet Front End application are no longer being used based on notifications from the session control applications of the real time communications service; and in response to determining that all public IP addresses hosted by the first Packet Front End application are no longer being used, sending a terminate notification to the first Packet Front End application.

In some embodiments, the applications of the communications service (e.g., session control applications, maintenance management application(s), Packet Front End application(s), Session Load Balancer application(s)) are cloud native applications that are optimized and/or designed to run or be executed on guest operating systems of the virtual machines provided by the Public Cloud Infrastructure system.

In various embodiments, the Public Cloud Infrastructure System is implemented as a Kubernetes system; the virtual machines are Kubernetes worker nodes; and each of the applications is a Kubernetes Pod (e.g., session control applications, maintenance management application(s), Packet Front End application(s), Session Load Balancer application(s) are Kubernetes Pods).

In various embodiments, one or more of the servers of the Public Cloud Infrastructure System are hardware servers or compute nodes including one or more processors and memory.

In various embodiments, the communications service is a real time communications service. In such embodiments, the real time communications service is a Session Border Controller service.

Another exemplary embodiment of the present invention includes the following steps being implemented to provide a real time communications service (e.g., a session border controller service) in a Public Cloud infrastructure system: registering, by a maintenance management Pod of the real time communications service, to receive notifications from a Public Cloud maintenance and management entity for maintenance events scheduled for Pods, Kubernetes nodes/virtual machines or servers of the Public Cloud infrastructure system being used to implement the real time communications service, said Public Cloud maintenance and management entity managing the maintenance of Pods, Kubernetes nodes/virtual machine, and servers in the Public Cloud infrastructure system; receiving, by the maintenance management Pod, a first maintenance notification indicating a first Kubernetes node/virtual machine is to undergo a first maintenance event (e.g., the Kubernetes node/virtual machine's guest operating system is to be upgraded); determining, by the maintenance management Pod, a first Packet Front End Pod of the real time communications service executing on the first Kubernetes node/virtual machine; determining, by the maintenance management Pod, public IP addresses being hosted by the first Packet Front End pod; and notifying, by the maintenance management Pod, session control pods of the real time communications service to drain the determined public IP addresses being hosted by the first Packet Front End Pod.

In some such embodiments, the method further includes the steps of: in response to receiving a notification to drain a public IP address corresponding to a media Internet Protocol address, each session control pod of the real time communications service stops using the public IP address in Session Description Protocol offer and answer messages for new dialogs; and in response to receiving a notification to drain a public IP address corresponding to a signaling Internet Protocol address, each session control pod of the real time communications service upon receiving an initial dialog request (e.g., initial INVITE or out-of-dialog request, e.g., PUBLISH) from a signaling IP address for which a drain notification was received, populates a Contact header of a reply message with a signaling IP address for which no draining notification has been received.

In some such embodiments, the method further includes that: each session control pod of the real time communications service determines when a public IP address for which a drain notification has been received is no longer being used by the session control pod; and in response to determining that a public IP address for which a drain notification has been received is no longer in use at the session control pod, sending a notification to the maintenance management pod that the public IP address is no longer in use at the session control pod.

In various embodiments, the method further includes the steps of: determining by the maintenance management pod when all public IP addresses hosted by the first Packet Front End pod are no longer being used based on notifications from the session control pods of the real time communications service; and in response to determining that all public IP addresses hosted by the first Packet Front End pod are no longer being used, sending a terminate notification to the first Packet Front End pod.

In some embodiments, the method further includes the step of: receiving by the first Packet Front End pod, the terminate notification from the maintenance management pod; and terminating operation by the first Packet Front End pod.

In various embodiments, the first maintenance notification is received a first amount of time before the first maintenance event (e.g., a sufficient amount of time before the first maintenance event to be able to drain the public IP addresses). In some embodiments, the public IP addresses hosted by the first Packet Front End pod are drained prior to the first maintenance event. In various embodiments, draining the public IP addresses hosted by the first Packet Front End pod prior to the first maintenance event includes each of the session control pods of the real time communications service ceasing to use the public IP addresses hosted by the first Packet Front End pod. In some embodiments, the first amount of time is at least 20 minutes before the first maintenance event.

In some embodiments, the method further includes that prior to receiving the first maintenance notification the following steps are performed: creating the real time communications service (e.g., a Session Border Controller service) by: (i) instantiating the first Packet Front End Pod on the first Kubernetes node/virtual machine, said first Packet Front End Pod being assigned a first set of public IP addresses (e.g., a first plurality of Public IP addresses) to host; (ii) instantiating a second Packet Front End Pod on a second Kubernetes node/virtual machine, said second Packet Front End Pod being assigned a second set of public IP addresses (e.g., a second plurality of public IP addresses) to host, said first set of public IP addresses not including any of the public IP addresses in the second set of public IP addresses; (iii) instantiating a plurality of session control pods, at least some of said session control pods not being located on the first Kubernetes node/virtual machine; (iv) instantiating a session load balancer pod, said session load balancer pod not being located on the first Kubernetes node/virtual machine; and (v) instantiating said maintenance manager pod, said maintenance manager pod not being located on the first Kubernetes node/virtual machine. In some embodiments, the first Packet Front End pod and said second Packet Front End pod host all public IP addresses used by the real time communications service to communicate with external entities. In most embodiments, the session load balancer distributes SIP messages received by the first Packet Front End pod and the second Packet Front End pod to the session control pods of the real time communications service of the Public Cloud infrastructure system.

In various embodiments, each of the session control pods of the real time communications service performs session processing operations on SIP messages received from the session load balancer pod; and wherein each of the session control pods of the real time communications service performs media processing operations on media streams.

In some embodiments, the method further includes the steps of: in response to receiving the first maintenance notification indicating the first Kubernetes node/virtual machine is to undergo a first maintenance event, monitoring by the maintenance management pod the status of the first Packet Front End pod determined to being executing on the first Kubernetes node/virtual machine; and upon detecting that the first Packet Front end pod has terminated operation, notifying all session control pods of the real time communications service that notification pertaining to the public IP addresses hosted by the first Packet Front End pod are no longer valid.

In various embodiments, the first maintenance event is one of the following: (i) a guest operating system update for a guest operating system executing on the first Kubernetes node, (ii) a host operating system update for an operating system executing on a first server on which the first Kubernetes node is located, (iii) an update to the hypervisor software on the first server on which the first Kubernetes node is located; (iv) a hardware update which will cause the first Packet Front End Pod to terminate (e.g., a hardware update or upgrade to the first server on which the first Kubernetes node is located); (v) an update to the Kubernetes system software for the first server or the first Kubernetes node; (vi) a driver update for the first sever, and (vii) an anticipated hardware failure.

In some embodiments, the first maintenance event is an update to or maintenance to be performed on one or more of the following: a virtual machine, the first Kubernetes node, an operating system, or hardware which will cause the first Packet Front End Pod to terminate.

The present invention is applicable to apparatus and system embodiments wherein one or more servers, nodes, applications or devices of a Public Cloud Infrastructure system implement the steps of the method embodiments. In some system embodiments, one or more steps of the method are implemented in one or more of the following a computing device/node, or server, a communications processing device, or network equipment of a Public Cloud system. In various embodiments, these pieces of equipment and other apparatus/devices of the system include a processor and a memory, the memory including instructions that when executed by the processor control the apparatus/device of the system to operate to perform the steps, operations or functions described in connection with the method embodiments of the invention.

An exemplary system embodiment in accordance with the present invention includes: a Public Cloud infrastructure system including a plurality of servers, each server including one or more Kubernetes worker nodes implemented as a virtual machine; a maintenance management Pod of a real time communications service (e.g., a session border controller service) located on one of the plurality of servers, that is operated to: register to receive notifications from a Public Cloud maintenance and management entity for maintenance events scheduled for Pods, Kubernetes nodes/virtual machines or servers of the Public Cloud infrastructure system being used to implement the real time communications service, said Public Cloud maintenance and management entity managing the maintenance of Pods, Kubernetes nodes/virtual machines, and servers in the Public Cloud infrastructure system; receive a first maintenance notification indicating a first Kubernetes worker node is to undergo a first maintenance event (e.g., the Kubernetes node/virtual machine's guest operating system is to be upgraded); determine a first Packet Front End pod of the real time communications service executing on the first Kubernetes node; determine public IP addresses being hosted by the first Packet Front End pod; and notify session control pods of the real time communications service to drain the determined public IP addresses being hosted by the first Packet Front End pod. In some such embodiments, the server on which the maintenance management pod is located includes a processor and memory, the processor controlling the server to perform the operations of the maintenance management pod. In some embodiments, the real time communications service is a Session Border Controller service in which Packet Front End pods host the public IP addresses for user by the Session Border Controller service, the Packet Front End pods including the first Packet Front End pod and a second Packet Front End pod.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 6 comprises the combination of FIGS. 6A, 6B, and 6C.

DETAILED DESCRIPTION

Figure 1:
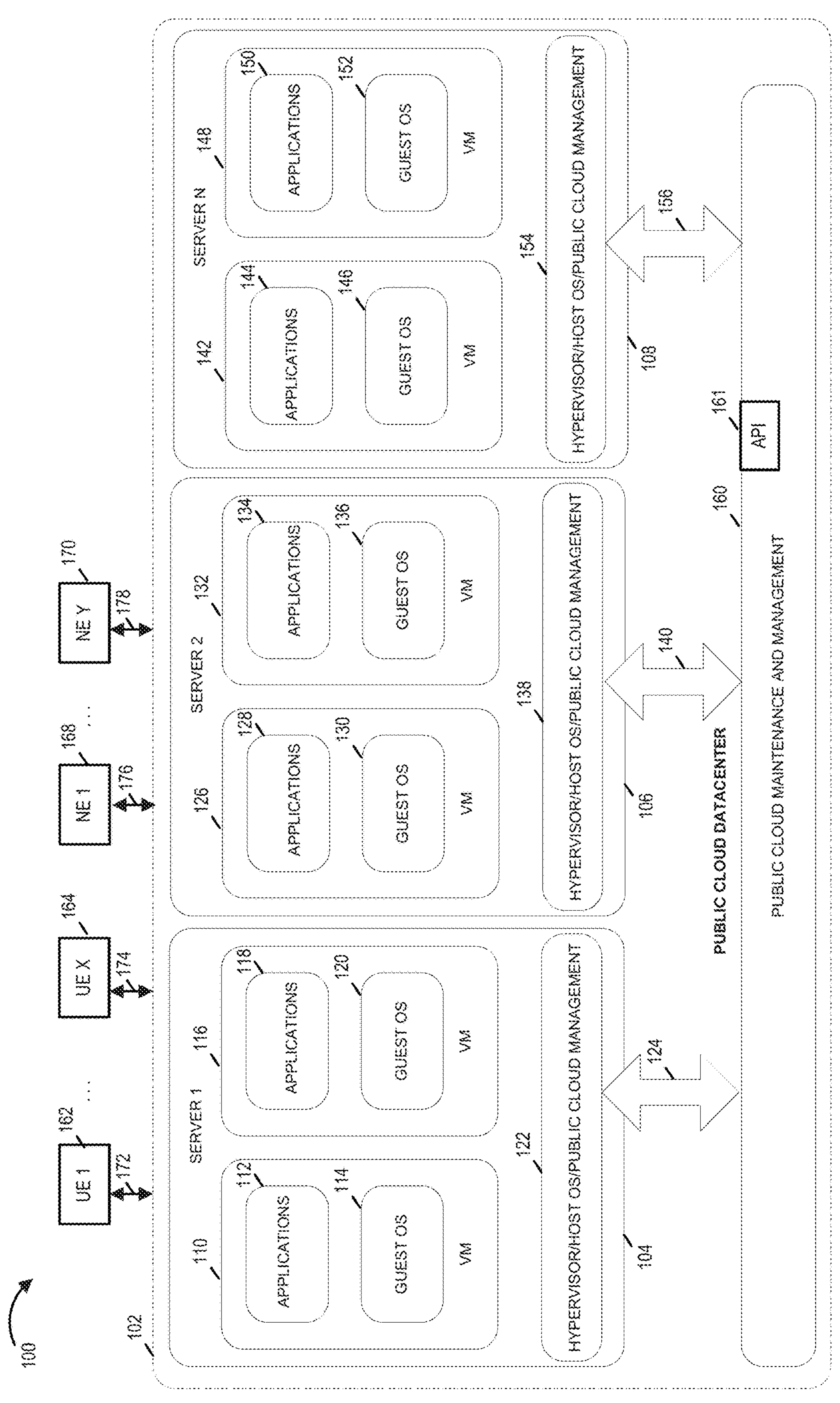
FIG. 1 illustrates an exemplary system in accordance with an embodiment of the present invention.

The present invention is directed to new and/or improved methods, systems and apparatus for handling maintenance events in Public Clouds with no or minimal service impact. The present invention provides new and/or improved methods, systems and apparatus for draining and/or moving Public Internet Protocol (IP) addresses from/between instances in Public Clouds with no or minimal impact to applications and/or service logic. For example, with the draining and/or moving of Public Internet (IP) addresses occurring prior to a maintenance event occurring which would interrupt the service. Various embodiments of the present invention address one or more of the problems described above.

In some embodiments of the present invention a mechanism/method is defined to move Public IP addresses without impacting or minimally impacting service logic for certain scenarios, particularly for cases in which a Session Border Controller (SBC) in a Public Cloud will be used as the target deployment. However, the mechanism/method can also be adapted and/or applied to other real time applications. An SBC consisting of a Packet Front End (PFE), Session Initiation Protocol (SIP) Load Balancer (SLB), and Session Control (SC) workloads will be used as an exemplary model. In some embodiments, at least some of these functionalities are collapsed into a single component for some implementations. The solution can be implemented using native Public Cloud Virtual Machines (VMs) or VMs can be used as Kubernetes Nodes. This does not impact the mechanism in general.

The Packet Front End (PFE) acts as the entry/exit point for all IP packets to/from external entities and hosts Public IP addresses.

The Session Initiation Protocol Load Balancer (SLB) acts as the entry/exit point for all SIP messages and distributes them to session control (SC) instances. The SLB sends/receives IP packets carrying the SIP messages to/from PFEs.

The Session Control instance (SC) performs all session processing on SIP messages and on the media streams. It sends/receives SIP messages to/from SLB. It sends/receives IP packets for media streams to/from PFEs.

In various embodiments of the invention, a new Maintenance Manager component/element (MM) is implemented. The Maintenance Manager component monitors the list of all Virtual Machines (VMs) used for the application.

Maintenance Manager Procedures/Pseudocode

The Maintenance Manager registers for maintenance event alerts to Public Cloud Infrastructure for all the Virtual Machines implementing a cluster of SBCs (i.e., SBC cluster). These maintenance events are usually sent at approximately or at least 30 minutes before the maintenance is to commence and sometimes even earlier depending on the type/reason for the maintenance. It is also possible to change the schedule of some events to a later time.

The Maintenance Manager after receiving an event alert or notification will determine: 1) whether the event is capable of being re-scheduled to a different time (e.g., a later time), 2) whether the event should be re-scheduled for a different time (e.g., a later time), and 3) upon determining that the event should be re-scheduled to a different time (e.g., a later time), a time for the maintenance event to occur based on the event type and configuration of the SBC as it pertains to maintenance event.

The Maintenance Manager (MM) will trigger draining (e.g., ceasing of usage) of the Public IP addresses which are to be impacted by the event.

If the event pertains to a PFE VM

MM will start monitoring the state of the PFE VM

MM will notify all SC instances that Public IP Addresses hosted by the PFE should be drained After PFE VM is terminated (either due to event (e.g., a maintenance event) or for some other reason)

MM will let all SC instances know that the notifications pertaining to the Public IPs hosted by the PFE are no longer valid If "IP Address not used anymore" notification is received from all SC instances for all IP Addresses Notify PFE that it can be terminated Session Control Procedures/Pseudocode For each IP Address for which a MM notification is received If it is a Media IP Address Do not use the IP Address in Session Description Protocol (SDP) for a session offer/answer pertaining to a new dialog If all sessions using the IP Address are terminated or there were no such sessions Notify MM that the IP Address is not used anymore If it is a Signaling IP Address If an initial dialog request, e.g., initial SIP INVITE, or out-of-dialog request, e.g., SIP PUBLISH, is received from the IP Address Populate the Contact header of the reply with a Signaling IP address for which no draining notification is received If all dialogs using the IP Address are terminated or if there were no such dialogs Notify MM that the IP Address is not used anymore PFE Procedures/Pseudocode If "terminate" notification is received from MM Terminate FIG. 1 illustrates an exemplary system 100 in accordance with an embodiment of the present invention. The exemplary system 100 includes a plurality of user equipment devices (UE 1 162, . . . , UE X 164, X being an integer greater than 1) such as for example phones, smartphones, tablets, laptops, computers, etc., a plurality of network equipment devices (NE 1 168, . . . , NE Y 170, Y being an integer greater than 1) such as for example communications equipment, SBCs, PBXes, etc., and a Public Cloud Infrastructure/System 102. The user equipment devices UE 1 162, . . . , UE X 164 being coupled to the Public Cloud Infrastructure/System 102 via communications links 172, . . . , 174 respectively. The network equipment devices NE 1 168, . . . , NE Y 170 being coupled to the Public Cloud Infrastructure/System 102 via communications links 176, . . . , 178 respectively.

The Public Cloud Infrastructure/System 102 includes a plurality of servers (server 1 104, server 2 106, . . . , server N 108, where N is an integer greater than 2), a public cloud datacenter including a public cloud maintenance and management entity/node 160. Each of the servers of the plurality of servers include a hypervisor/host operating system/public cloud management component and one or more virtual machines. Some hypervisors run directly on the hardware resources of the host machine. Hosted hypervisors run on top of the host operating system (OS) of the host machine. Virtual machines are files that recreate the computing environment of a physical computer. A hypervisor is software that runs these files. Hypervisors allocate hardware resources to virtual machines and ensure they remain independent from one another, thereby maintaining the system. Furthermore, a hypervisor is software that enables multiple instances of operating system (e.g., guest operating systems) to run on the same physical computing resources (e.g., a server). The present invention is applicable to both hosted and non-hosted hypervisor implementations. In some embodiments, the public cloud management component is an integral part of the host operating system whereas in other embodiments it is software that executes on top of the host operating system. The Public Cloud Infrastructure/System 102 includes a plurality of interfaces and has been assigned a plurality of public IP addresses that it can utilize to communicate with devices outside the Public Cloud Infrastructure/System 102 (e.g., UE 1 262, . . . , UE X 264, NE 1 268, . . . , NE Y 270). In various embodiments, one or more of the plurality of servers include interfaces which are assigned or allocated public IP addresses as well as private IP addresses. Not all servers need to have assigned or allocated public IP addresses. In various embodiments, the interfaces of the public cloud system are included in separate network equipment which are coupled to the servers of the Public Cloud Infrastructure/System.

Server 1 104 includes a hypervisor/host operating system/public cloud management component 122 and a plurality of virtual machines 110 and 116 with each virtual machine including a guest operating system and one or more applications. Guest operating system 114 and applications 112 are executing on virtual machine 110. Guest operating system 120 and applications 118 are executing on virtual machine 116.

Server 2 106 includes a hypervisor/host operating system/public cloud management component 138 and a plurality of virtual machines 126 and 132 with each virtual machine including a guest operating system and one or more applications. Guest operating system 130 and applications 128 are executing on virtual machine 126. Guest operating system 136 and applications 134 are executing on virtual machine 132.

Server N 108 includes a hypervisor/host operating system/public cloud management component 154 and a plurality of virtual machines 142 and 148 with each virtual machine including a guest operating system and one or more applications. Guest operating system 146 and applications 144 are executing on virtual machine 142. Guest operating system 152 and applications 150 are executing on virtual machine 148. Each of the servers is connected and/or coupled to a public cloud datacenter Public Cloud Maintenance and Management entity/node 160 via a communication link over which data/information, e.g., maintenance event notifications and/or messages, are exchanged. The public cloud datacenter Public Cloud Maintenance and Management entity/node 160 is coupled to the server 1 104 via communications link 124. The public cloud maintenance and management system in various embodiments includes an Application Programming Interface (API) 161 through which applications executing on servers and/or nodes of the public cloud system can register to receive notifications of maintenance events (e.g., type of maintenance to be performed, scheduling information for the maintenance event (when it is to occur), entities on which the maintenance is to be performed and/or which will be affected (e.g., which servers/nodes, VMs, etc.) and through which the notifications can be provided to the applications. Data/information can be exchanged for example between the public cloud maintenance and management entity/node/server 160 and the hypervisor/host operating system/public cloud management component 122 of server 1 104. The public cloud datacenter Public Cloud Maintenance and Management entity/node 160 is coupled to the server 2 106 via communications link 140. Data/information can be exchanged for example between the public cloud maintenance and management entity/node/server 160 and the hypervisor/host operating system/public cloud management component 138 of server 2 106. The public cloud datacenter Public Cloud Maintenance and Management entity/node 160 is coupled to the server N 108 via communications link 156. Data/information can be exchanged for example between the public cloud maintenance and management entity/node/server 160 and the hypervisor/host operating system/public cloud management component 154 of server N 108. The real time communications application/service is implemented in the applications executing on the servers.

For example, a Session Border Controller service may be, and in some embodiments is implemented in the following manner: applications 112 include a first session control application and a second session control application; applications 118 include a first Processing Front End application, applications 128 include a second Processing Front End application; applications 134 include a session load balancer application; applications 144 include a maintenance management application; and applications 150 include a third session controller application and a fourth session controller application. These applications working together as describe above provide a session border controller service and when implementing the maintenance event handling procedures described above provide that session border controller service with minimal or no maintenance service impacts and/or interruptions for example to on-going sessions. In some such implementations, the maintenance management application would register with the public cloud maintenance and management entity/node 160 and/or public cloud management component 122 to receive maintenance event notifications that would impact the servers and/or virtual machines on which applications which comprised the Session Border Controller service where executing and upon receiving a maintenance event notification would implement the procedures described above. In turn the Processing Front Ends and Session Controls would also implement the procedures described above to minimize and/or eliminate maintenance service impact to on-going sessions using public IP addresses that would be impacted by the upcoming maintenance event.

Figure 2:
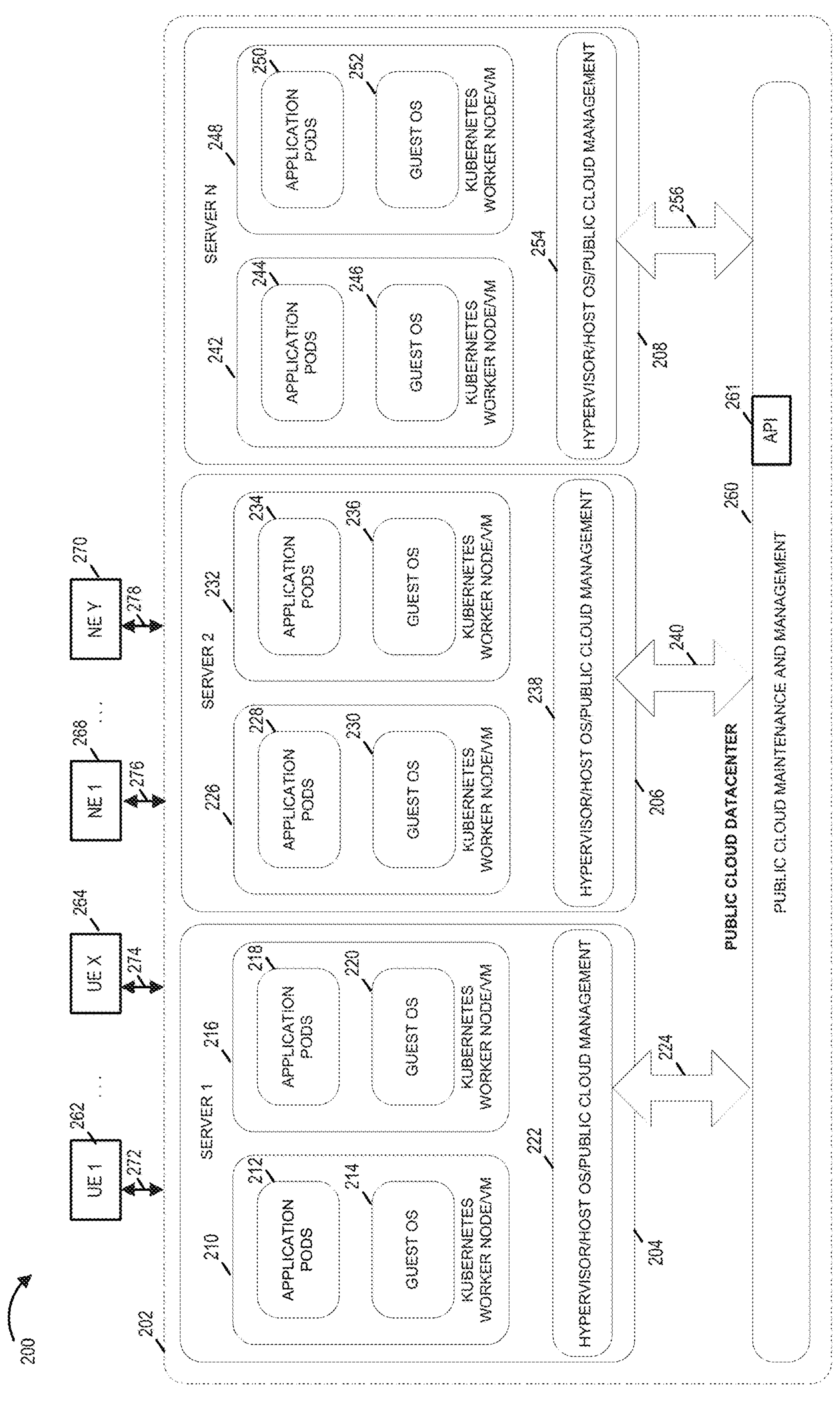
FIG. 2 illustrates another exemplary system in accordance with an embodiment of the present invention.

FIG. 2 illustrates another exemplary system in accordance with an embodiment of the present invention. The exemplary system 200 includes a plurality of user equipment devices (UE 1 262, . . . , UE X 264, X being an integer greater than 1) such as for example phones, smartphones, tablets, laptops, computers, etc., a plurality of network equipment devices (NE 1 268, . . . , NE Y 270, Y being an integer greater than 1) such as for example communications equipment, SBCs, PBXes, etc., and a Public Cloud Infrastructure/System 202. The user equipment devices UE 1 262, . . . , UE X 264 being coupled to the Public Cloud Infrastructure/System 202 via communications links 272, . . . , 274 respectively. The network equipment devices NE 1 268, . . . , NE Y 270 being coupled to the Public Cloud Infrastructure/System 202 via communications links 276, . . . , 278 respectively.

The Public Cloud Infrastructure/System 202 includes a plurality of servers (server 1 204, server 2 206, . . . , server N 208, where N is an integer greater than 2), a public cloud datacenter including a public cloud maintenance and management entity/node 260. Each of the servers of the plurality of servers include a hypervisor/host operating system/public cloud management component and one or more Kubernetes worker nodes/virtual machines. Some hypervisors run directly on the hardware resources of the host machine. Hosted hypervisors run on top of the host operating system (OS) of the host machine. Virtual machines are files that recreate the computing environment of a physical computer. A hypervisor is software that runs these files. Hypervisors allocate hardware resources to virtual machines and ensure they remain independent from one another, thereby maintaining the system. Furthermore, a hypervisor is software that enables multiple instances of operating system (e.g., guest operating systems) to run on the same physical computing resources (e.g., a server). The present invention is applicable to both hosted and non-hosted hypervisor implementations. In some embodiments, the public cloud management component is an integral part of the host operating system whereas in other embodiments it is software that executes on top of the host operating system. In Kubernetes systems, Kubernetes nodes may be physical machines or virtual machines. In this example, the Kubernetes worker nodes are implemented as virtual machines. The Public Cloud Infrastructure/System 202 includes a plurality of interfaces and has been assigned a plurality of public IP addresses that it can utilize to communicate with devices outside the Public Cloud Infrastructure/System 202 (e.g., UE 1 262, . . . , UE X 264, NE 1 268, . . . , NE Y 270). In various embodiments, one or more of the plurality of servers include interfaces which are assigned or allocated public IP addresses as well as private IP addresses. Not all servers need to have assigned or allocated public IP addresses. In various embodiments, the interfaces of the public cloud system are included in separate network equipment which are coupled to the servers of the Public Cloud Infrastructure/System.

Server 1 204 includes a hypervisor/host operating system/public cloud management component 222 and a plurality of Kubernetes worker node/virtual machines 210 and 216 with each Kubernetes worker node/virtual machine including a guest operating system and one or more application pods. Guest operating system 214 and application pods 212 are executing on Kubernetes worker node/virtual machine 210. Guest operating system 220 and application pods 218 are executing on Kubernetes worker node/virtual machine 216.

Server 2 206 includes a hypervisor/host operating system/public cloud management component 238 and a plurality of Kubernetes worker nodes/virtual machines 226 and 232 with each Kubernetes worker node/virtual machine including a guest operating system and one or more application pods. Guest operating system 230 and application pods 228 are executing on Kubernetes worker node/virtual machine 226. Guest operating system 236 and application pods 234 are executing on Kubernetes worker node/virtual machine 232.

Server N 208 includes a hypervisor/host operating system/public cloud management component 254 and a plurality of Kubernetes worker nodes/virtual machines 242 and 248 with each Kubernetes worker node/virtual machine including a guest operating system and one or more application pods. Guest operating system 246 and application pods 244 are executing on Kubernetes worker node/virtual machine 242. Guest operating system 252 and application pods 250 are executing on Kubernetes worker node/virtual machine 248. Each of the servers is connected and/or coupled to a public cloud datacenter Public Cloud Maintenance and Management entity/node 260 via a communication link over which data/information, e.g., maintenance event notifications and/or messages, are exchanged. The public cloud datacenter Public Cloud Maintenance and Management entity/node 260 is coupled to the server 1 204 via communications link 224. Data/information can be exchanged for example between the public cloud maintenance and management entity/node/server 260 and the hypervisor/host operating system/public cloud management component 222 of server 1 204. The public cloud datacenter Public Cloud Maintenance and Management entity/node 260 is coupled to the server 2 206 via communications link 240. Data/information can be exchanged for example between the public cloud maintenance and management entity/node/server 260 and the hypervisor/host operating system/public cloud management component 238 of server 2 206. The public cloud datacenter Public Cloud Maintenance and Management entity/node 260 is coupled to the server N 208 via communications link 256. Data/information can be exchanged for example between the public cloud maintenance and management entity/node/server 260 and the hypervisor/host operating system/public cloud management component 254 of server N 208. The real time communications application/service is implemented in the application pods executing on the servers. The real time application/service including at least one maintenance management pod which registers with the public cloud maintenance infrastructure, e.g., public cloud maintenance and management entity/node 260 to receive notifications about upcoming maintenance events which will affect the Kubernetes worker nodes/virtual machines on which the pods which comprise the real time application/service is executing. The maintenance management pod of the real time application/service performs the procedures described above for moving/draining public IP addresses from application pods which will be affected, e.g., terminated, by the upcoming maintenance event. The public cloud maintenance and management entity 260 in various embodiments includes an Application Programming Interface (API) 261 through which Application Pods executing on servers of the public cloud system 202 can register to receive notifications of maintenance events (e.g., type of maintenance to be performed, scheduling information for the maintenance event (when it is to occur), entities on which the maintenance is to be performed and/or which will be affected (e.g., which servers/worker nodes, VMs, etc.) and through which the notifications can be provided to the Pods. For example, the maintenance management pod of the real time application/service described above may, and in various embodiments does, register to receive maintenance event notifications from the public cloud maintenance and management entity 260 through the API 261 of the public cloud maintenance and management entity 260. In various embodiments, the registration for maintenance event notifications and the maintenance management event notifications can therefore be received via the API 261 of the Public Cloud Maintenance And Management entity 260 and does not need to register with or obtain the maintenance event notifications from the hypervisor/host OS/cloud management entity 254.

Figure 3:
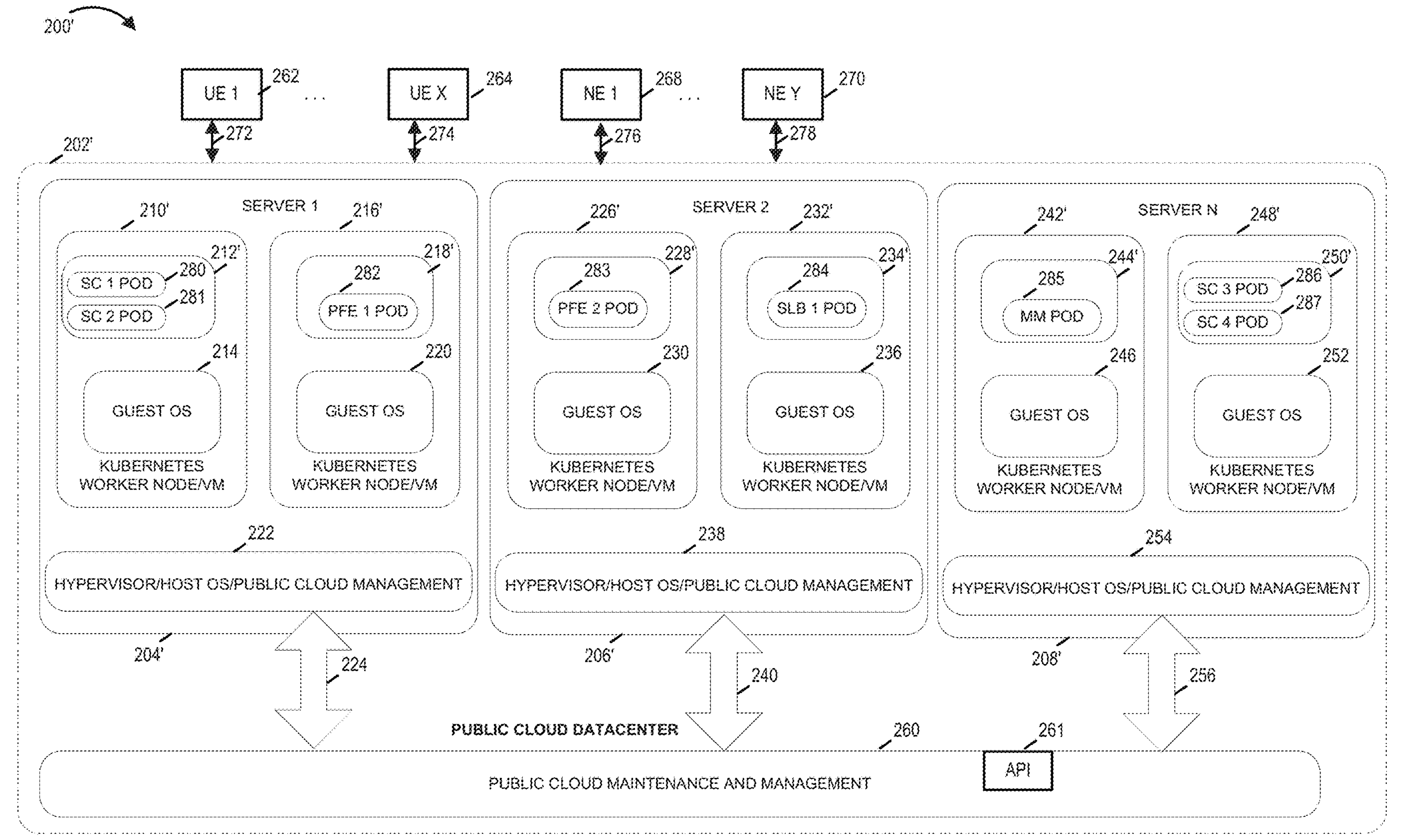
FIG. 3 illustrates an exemplary system implementing a Session Border Controller application/service in a Public Cloud in accordance with an embodiment of the present invention.

FIG. 3 illustrates exemplary system 200' which is system 200 which has been updated to show the implementation of a session border controller service in Public Cloud Infrastructure/System 202'. Elements labeled with the same numeral in multiple figures are the same or similar and will not be describe in detail again.

The Public Cloud Infrastructure/System 202' includes a plurality of servers (server 1 204', server 2 206', . . . , server N 208', where N is an integer greater than 2), a public cloud datacenter including a public cloud maintenance and management entity/node 260. Each of the servers of the plurality of servers include a hypervisor/host operating system/public cloud management component and one or more Kubernetes worker nodes/virtual machines. Some hypervisors run directly on the hardware resources of the host machine. Hosted hypervisors run on top of the host operating system (OS) of the host machine. Virtual machines are files that recreate the computing environment of a physical computer. A hypervisor is software that runs these files. Hypervisors allocate hardware resources to virtual machines and ensure they remain independent from one another, thereby maintaining the system. Furthermore, a hypervisor is software that enables multiple instances of operating system (e.g., guest operating systems) to run on the same physical computing resources (e.g., a server). The present invention is applicable to both hosted and non-hosted hypervisor implementations. In some embodiments, the public cloud management component is an integral part of the host operating system whereas in other embodiments it is software that executes on top of the host operating system. In Kubernetes systems, Kubernetes nodes may be physical machines or virtual machines. In this example, the Kubernetes worker nodes are implemented as virtual machines. The Public Cloud Infrastructure/System 202' includes a plurality of interfaces and has been assigned a plurality of public IP addresses that it can utilize to communicate with devices outside the Public Cloud Infrastructure/System 202 (e.g., UE 1 262, . . . , UE X 264, NE 1 268, . . . , NE Y 270). In various embodiments, one or more of the plurality of servers include interfaces which are assigned or allocated public IP addresses as well as private IP addresses. Not all servers need to have assigned or allocated public IP addresses. In various embodiments, the interfaces of the public cloud system are included in separate network equipment which are coupled to the servers of the Public Cloud Infrastructure/System.

Server 1 204' includes a hypervisor/host operating system/public cloud management component 222 and a plurality of Kubernetes worker node/virtual machines 210' and 216' with each Kubernetes worker node/virtual machine including a guest operating system and one or more application pods. Guest operating system 214 and application pods 212' are executing on Kubernetes worker node/virtual machine 210'. Guest operating system 220 and application pods 218' are executing on Kubernetes worker node/virtual machine 216'. The application pods 212' include Session Control (SC) 1 pod 280 and Session Control (SC) 2 pod 281. The application pods 218' includes Packet Front End (PFE) 1 pod 282.

Server 2 206' includes a hypervisor/host operating system/public cloud management component 238 and a plurality of Kubernetes worker nodes/virtual machines 226' and 232' with each Kubernetes worker node/virtual machine including a guest operating system and one or more application pods. Guest operating system 230 and application pods 228' are executing on Kubernetes worker node/virtual machine 226'. Guest operating system 236 and application pods 234' are executing on Kubernetes worker node/virtual machine 232'. The application pods 228' include Packet Front End (PFE) 2 pod 283. The application pods 232' includes Session Load Balancer (SLB) 1 pod 284.

Server N 208' includes a hypervisor/host operating system/public cloud management component 254 and a plurality of Kubernetes worker nodes/virtual machines 242' and 248' with each Kubernetes worker node/virtual machine including a guest operating system and one or more application pods. Guest operating system 246 and application pods 244' are executing on Kubernetes worker node/virtual machine 242'. Guest operating system 252 and application pods 250' are executing on Kubernetes worker node/virtual machine 248'. The application pods 244' include Maintenance Management (MM) pod 285. The application pods 248' includes Session Control (SC) 3 pod 286 and Session Control (SC) 4 pod 287.

In this example, the Session Border Controller service/application includes Session Control (SC) 1 pod 280 and Session Control (SC) 2 pod 281 executing on Kubernetes worker node/virtual machine 210', Session Control (SC) 3 pod 286 and Session Control (SC) 4 pod 287 executing on Kubernetes worker node/virtual machine 248', PFE 1 pod 282 executing on Kubernetes worker node/virtual machine 216', PFE 2 pod 283 executing on Kubernetes worker node/virtual machine 226', Session Initiation Protocol (SIP) SLB 1 pod 284 executing on Kubernetes worker node/virtual machine 232', and Maintenance Management pod 285 executing on Kubernetes worker node/virtual machine 242'

The solution can be implemented using native Public Cloud Virtual Machines (VMs) or as in this case the VMs can be used as Kubernetes Nodes.

The Packet Front Ends (PFEs) 282 and 283 act as the entry/exit points for all IP packets to/from external entities, e.g., user devices (UE 1 262, . . . , UE X 264) and network equipment devices (NE 1 268, . . . , NE Y 270). The PFEs host Public IP addresses for communicating with the external entities.

The Session Initiation Protocol Load Balancer (SLB) 1 284 acts as the entry/exit point for all Session Initiation Protocol (SIP) messages and distributes these SIP messages to session control (SC) instances/pods (i.e., SC 1 pod 280, SC 2 pod 281, SC 3 pod 286, SC 4 pod 287). The SLB 1 pod 284 sends/receives IP packets carrying the SIP messages to/from PFEs, i.e., PFE 1 pod 282 and PFE 2 pod 283.

The Session Control (SC) instance/pods 280, 281, 286, and 287 perform all session processing on SIP messages and on the media streams. SC pods 280, 281, 286 and 287 send/receive SIP messages to/from SLB 1 pod 284. SC pods 280, 281, 286 and 287 send/receive IP packets for media streams to/from PFE pods 282 and 283.

The Maintenance Manager (MM) pod 285 monitors the list of all Kubernetes worker nodes/Virtual Machines (VMs) used for the session border controller service/application which in this example is Kubernetes worker nodes/virtual machines 210', 216', 226', 232', 242', and 248'.

Each of the servers is connected and/or coupled to a public cloud datacenter Public Cloud Maintenance and Management entity/node 260 via a communication link over which data/information, e.g., maintenance event notifications and/or messages, are exchanged. The pods of the session border controller service/applications implement the procedures described above to avoid and/or minimize maintenance service event impacts on the session border controller service.

The maintenance manager pod 285 of the session border controller service/application registers with the Public Cloud Maintenance and Management entity 260 of the Public Cloud infrastructure system 202'. The registration may, and in some embodiments does, occur via the use of an Application Programming Interface 261 exposed by the public cloud maintenance and management entity. The Public Cloud Maintenance and Management entity 260 manages the maintenance of Public Cloud including of Pods, Kubernetes worker nodes/virtual machines, and servers and provides notifications of scheduled maintenance events to registered Pods, applications, nodes. Reasons for maintenance events include for example operating systems upgrades and/or updates (e.g., guest operating system or host operating system upgrades and/or updates), Kubernetes system updates, virtual machine updates, driver updates, security patches, anticipated hardware failures, etc.

Upon notification of a scheduled maintenance event, the maintenance manager pod 285 will determine if it will impact one of the PFE pods of the session border controller service/application, the maintenance manager will implement the procedures described above to avoid service impact. These procedures include triggering the draining of Public IP addresses which would be impacted by the maintenance event.

Figure 4:
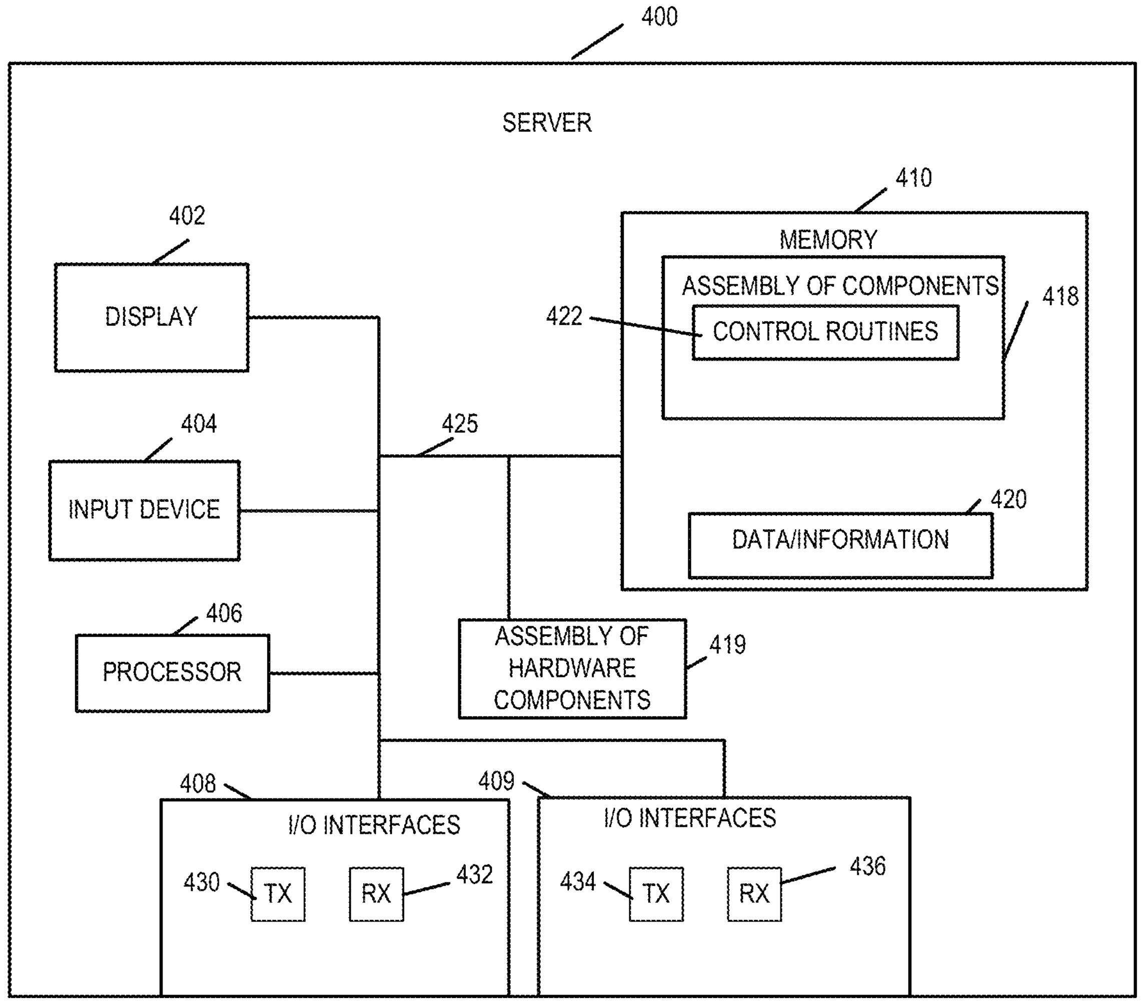
FIG. 4 illustrates an exemplary server in accordance with an embodiment of the present invention.

FIG. 4 illustrates an exemplary server 400 in accordance with an embodiment of the present invention. Servers 104, 106, 108, 204, 206, 208, 204', 206', 208' may be, and in some embodiments are, implemented in accordance with exemplary server 400 described in further detail below. In various embodiments, the Public Cloud Data center and/or the public cloud maintenance and management entity 160, 260 are implemented in accordance with exemplary server 400. In some embodiments, the Public Cloud Data Center and/or the public cloud maintenance and management entity 160, 260 are network equipment devices including one or more processors, memory and interfaces. The memory including instructions which when executed by the one or more processors control the Public Cloud Data Center and/or the public cloud maintenance and management entity 160, 260 to perform operations, steps and/or functions discussed in connection with the Figures and/or methods of the invention.

In various embodiments, the Public Cloud Infrastructure System 102, 202 and/or 202' include a cloud orchestration server or device with orchestration and cloud management software. The cloud orchestration server performs operations to manage the Public Cloud including, among other things, allocation of Cloud resources, division of workloads between resources, and the deployment of services in the Cloud. The cloud orchestration server performing assignment or allocation of Public IP addresses to applications executing on virtual machines of servers of the Public Cloud Infrastructure System. In various embodiments, the cloud orchestration server includes one or more processors, interfaces and memory. The memory including instructions which when implement control the server to perform the operations to manage the Public Cloud as described above. In various embodiments, the cloud orchestration server is implemented in accordance with exemplary server 400.

Figure 5:
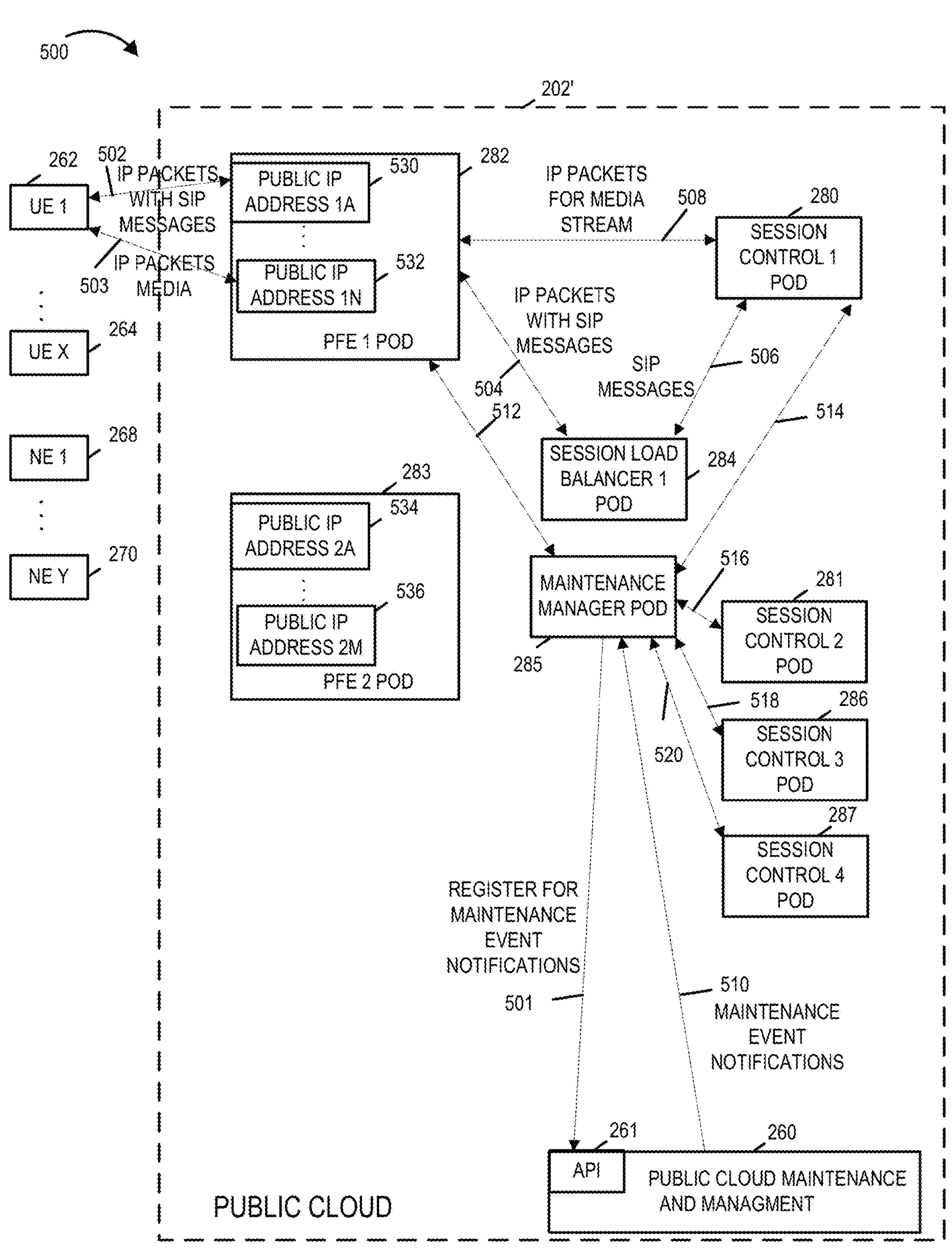
FIG. 5 illustrates an exemplary system in accordance with an embodiment of the present invention.

Diagram 500 of FIG. 5 illustrates the exemplary exchange of messages between various elements of system 200' shown in FIG. 3 which implements a session border controller service/application.

In diagram 500, the SIP Packet Front End 1 pod 282 has allocated to it (e.g., it hosts) a first plurality of public IP addresses (Public IP address 1A 530, . . . , Public IP address 1N 532, N being an integer greater than 1) for communicating with external entities. The SIP Packet Front End 2 pod 283 has allocated to it (e.g., it hosts) a second plurality of public IP addresses (Public IP address 2A 534, . . . , Public IP address 2M 536, M being an integer greater than 1) for communicating with external entities. In various embodiments, the first and/or second plurality of public IP addresses are bi-directional and/or correspond to interfaces which support bi-direction communications flows. While the public IP addresses are shown as being hosted by the SIP Packet Front End 1 pod and SIP Packet Front End 2 pod, the physical interfaces to which the public IP addresses are assigned to/correspond to are included in servers or network equipment of the system 200' with which the Pods can communicate.

The maintenance manager pod 285 sends one or more messages 501 to the public cloud maintenance and management entity 260 to register for notifications of maintenance events, e.g., maintenance events which will impact Pods, nodes, virtual machines or servers of the Public Cloud infrastructure system being utilized for providing the session border controller service/application.

In diagram 500, IP packets 502 and 503 are exchanged (sent/received) between external entity UE 1 262 and PFE 1 pod 282 using public IP address 1A 530 of the PFE 1 pod 282 and public IP address 1N 532 of PFE 1 pod 282. The IP packets with SIP messages 502 and IP packets with media 503 are part of a communications session including at least one media stream. The IP packets with SIP messages 502, a SIP INVITE message are received from the UE 1 262 at public IP address 1A and sent by the PFE 1 pod 282 to the Session Load Balancer (SLB) 1 pod 284 as IP packets with SIP messages 504 to be distributed to one of the plurality of session control (SC) pods 280, 281, 286, and 287. In this example the SLB 1 pod 284 distributes the SIP messages 506 from the IP packets with SIP messages 504 to session control 1 pod 280 for processing. The session control 1 pod 280 sends SIP messages for the session to the UE 1 262 via the session load balancer 1 pod 284, PFE 1 pod 282 to the UE 1 262 using a public IP address (e.g., public IP address 1A 530) hosted by PFE 1 pod 282. The session control 1 pod 280 hosts the media streams for the session. As a result, IP packets with media 503 received by the PFE 1 pod 282 at public IP address 1N are sent to the session control 1 280 and IP packets for the media stream for the session are session control 1 pod 280 to PFE 1 pod 282. The PFE 1 pod 282 using public IP address 1N for exchanging IP media packets with the UE 1 262 for the session. The exchange of IP packets for the media stream for the session being shown as IP packets for media stream 508 on diagram 500.

In this example, the Public Cloud Maintenance and management entity 260 has scheduled a maintenance event to upgrade the Guest Operating System 214 on Kubernetes worker node/virtual machine 210' and sends a maintenance event notification 510 indicating that maintenance on Kubernetes worker node/virtual machine 210' has been scheduled to occur at time 1 (e.g., 30 minutes from when the notification was sent) to the maintenance manager pod 285. Upon receiving the maintenance event notification 510, the maintenance manager pod 285 determines that public IP addresses 1A 530, . . . , public IP addresses 1N 532 being hosted by PFE 1 pod 282 will be impacted by the scheduled maintenance event. The maintenance manager pod 285 will then start monitoring the state of the PFE 1 pod 282 and Kubernetes node/virtual machine 210'. The maintenance manager pod 285 will exchange messages 514, 516, 518, 520 with all of the session controller pods regarding the scheduled maintenance event. The maintenance manager pod 285 will send to all the session controllers that the public IP address 1A 530, . . . , public IP address 1N 532 hosted by the PFE 1 pod 582 should be drained.

After receiving the notification to drain the public IP addresses 1A 530, . . . , public IP address 1N 532, each of the session controls will perform the following steps for each IP address for which a drain notification was received: (i) if the public IP address is a media IP address do not use the IP address in SDP for a session offer/answer pertaining to a new dialog and when all sessions using the IP address are terminated or there were no such sessions the session control pod will send a notification to the maintenance manager pod 285 that the IP address is not being used, (ii) if the public IP address is a signaling IP address, if an initial dialog request, e.g., initial SIP INVITE, or out-of-dialog request, e.g., SIP PUBLISH, is received from the IP address the session control pod will populate the Contact header of the reply with a Signaling IP address for which no draining notification is received (e.g., public IP address 2A 234 hosted by PFE 2 pod 283) and when all dialogs using the IP address are terminated or if there were no such dialogs the session control pod will notify the maintenance manager pod 285 that the IP address is no longer used.

In this case, session control 2 pod 281, session control 3 pod 286, and session control 4 pod 287 respond that they have no dialogs using the public IP addresses 1A 530, . . . , 1N 532. For the IP addresses other than public IP address 1A 530 and IP address 1N 532, the session control 1 pod 280 responds that it has no dialogs using those addresses. When the dialog using the IP address 1N 532 for the IP media packets of the session completes, the session control 1 pod 280 notifies the maintenance manager pod 285 that IP address 1N 532 is not being used. When the dialog for the session using the IP address 1A 530 completes, e.g., when the session is terminated, the session control 1 pod 280 notifies the maintenance manager pod 285 that the IP address 1A 530 is not being used. At this time, the maintenance manager 285 has received notifications from all of the session control pods making up the session border controller service/application that the public IP addresses 1A 530, . . . , 1N 532 are not being used. Upon determining by the maintenance manager that the public IP addresses 1A 530, . . . , 1N 532 are no longer in use the maintenance manager pod 285 sends a terminate notice 512 to the PFE 1 pod 282.

Upon receiving the terminate notice the PFE 1 pod 282 acknowledges receipt of the terminate notice and terminates. This occurs before the scheduled maintenance event occurs and hence there is no disruption of service.

Also once the PFE 1 pod 282 terminates or the Kubernetes worker node/virtual machine 210' terminates (either due to the maintenance event or for some other reason), the maintenance manager 285 notifies the session control 1 pod 280, session control 2 pod 281, session control 3 pod 286, and session control 4 pod 287 that notifications pertaining to the public IP addresses hosted by the PFE 1 pod 282 (public IP address 1A 530, . . . , public IP address 1N 532) are no longer valid.

Using the foregoing procedures, the impact of scheduled maintenance events on the session border controller service/application can be minimized and/or eliminated for various maintenance events.

FIG. 4 illustrates an exemplary server 400 in accordance with an embodiment of the present invention. Exemplary server/node 400 includes an optional display 402, an input device 404, a processor 406, e.g., a CPU, I/O interfaces 408 and 409, which couple the server/node 400 to networks or communications links and/or various other nodes/devices, memory 410, and an assembly of hardware components 419, e.g., circuits corresponding to different components and/or modules, coupled together via a bus 425 over which the various elements may interchange data and information. Memory 410 includes an assembly of components 418, e.g., an assembly of software components, and data/information 420. The assembly of software components 418 includes a control routines component 422 which includes software instructions which when processed and executed by processor 406 control the operation of the server/node 400 to perform various functions and/or one or more steps of the various method embodiments of the invention. The I/O interface 408 includes transmitters 430 and receivers 432. The I/O interface 409 includes transmitters 434 and receivers 436. The I/O interfaces are hardware interfaces including hardware circuitry. The server/node 400 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), Representative State Transfer (REST) protocol, SQL (Structured Query Language) Protocol, and HDFS (Hadoop Distributed File System) Protocol, SQL and/or HDFS being used to interface and access information from the various databases and/or storage devices to which it may be coupled. In some embodiments, the computing device/node 400 includes a communication component configured to operate using IP, TCP, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 400 can include more than one processor with the processing being distributed among the plurality of processors. The Pods and other programs/applications being executed on a Kubernetes node, e.g., application pods 212, 218, 228, 234, 244, 250 described in connection with FIG. 2 and SC 1 Pod, SC 2 Pod 212', PFE 1 Pod 218', PFE 2 Pod 228', SLB 1 Pod 234', MM Pod 244', SC 3 Pod SC 4 Pod 250' of FIG. 3 may be, and in some embodiments are, implemented as one of the components of the assembly of components 418 or 419 of server/node 400. In some embodiments, one or more of the following are implemented in accordance with the server 400 illustrated in FIG. 4: user equipment 1 162, . . . , UE X 164, NE 1 168, . . . , NE Y 170, server 1 104, server 2 106, server N 108, server 204, server 206, server 208, server 204', server 206', server 208', the public cloud maintenance and management entity 160, the public cloud maintenance and management entity 260.

Figure 7:
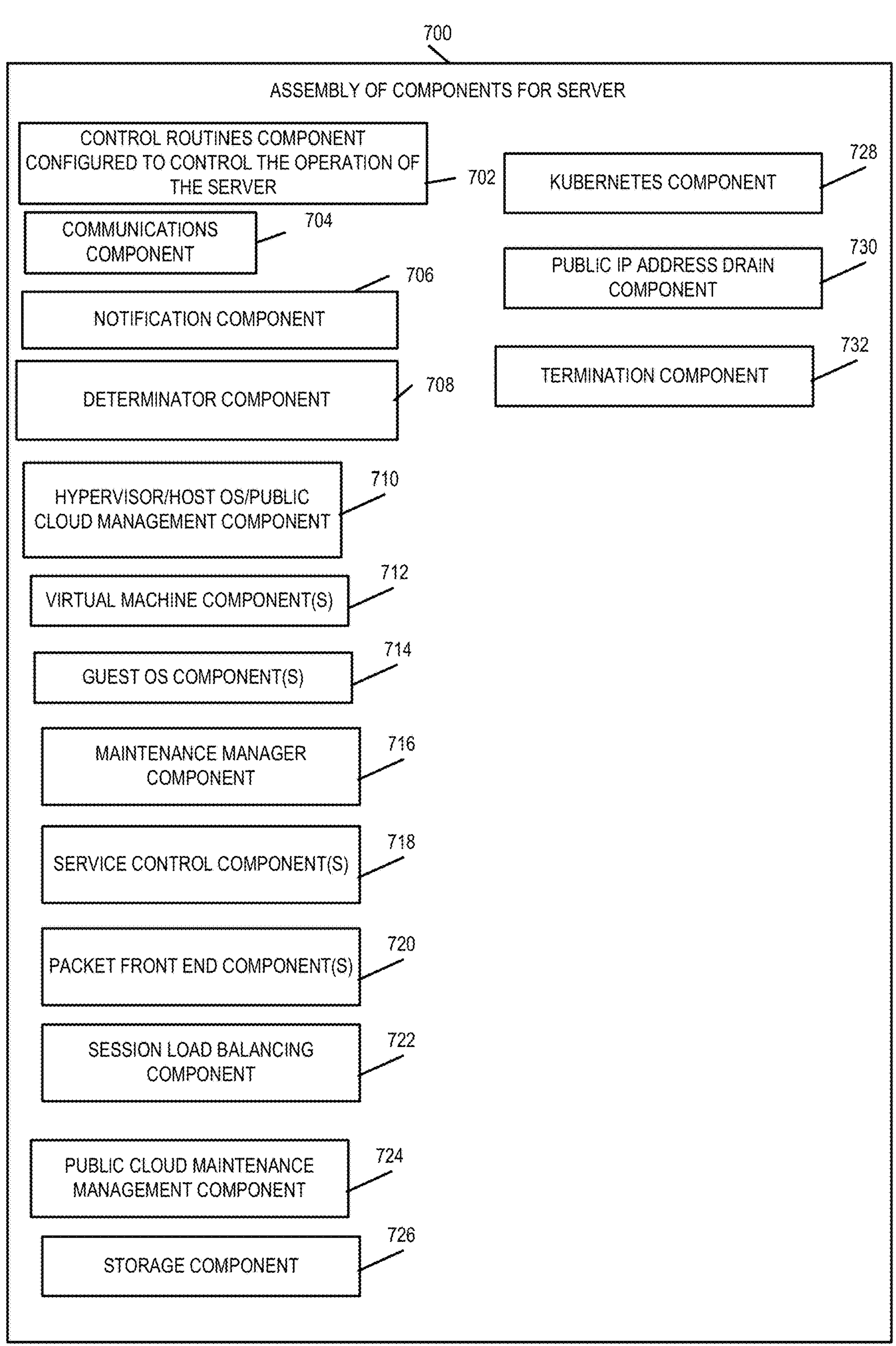
FIG. 7 illustrates an exemplary assembly of components for a server, e.g., a server of Public Cloud System, in accordance with an embodiment of the present invention.

An exemplary assembly of components 700 for a server in accordance with an embodiment of the present invention is illustrated in FIG. 7.

While in exemplary systems shown in the Figures there are only two virtual machines or Kubernetes worker nodes/VMs per server, each server may have one or more Kubernetes worker nodes/VMs and two Kubernetes worker nodes/VMs was only used for case of explaining the invention. Similarly, each of the servers may have multiple pods and/or applications.

Figure 6A:
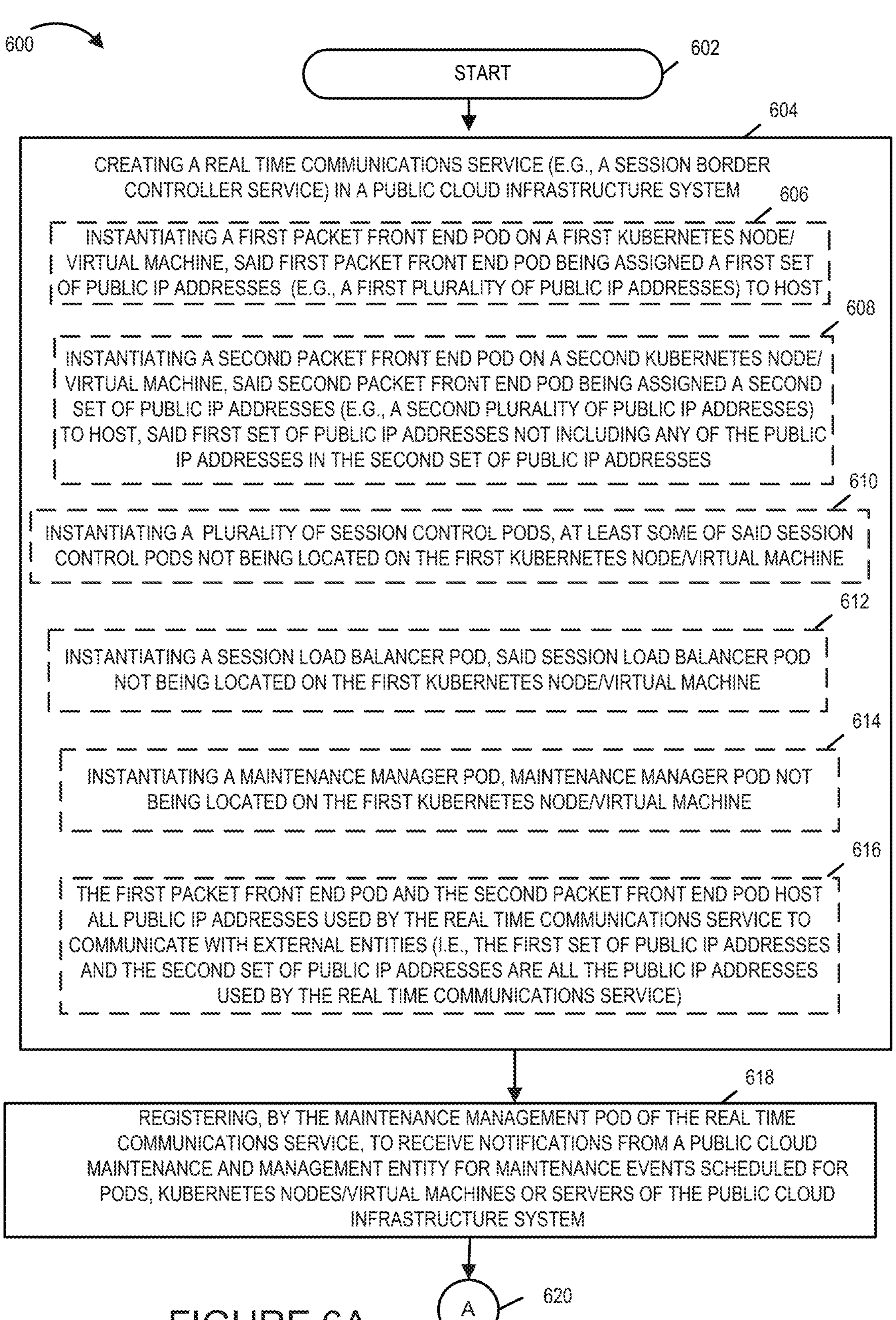
FIG. 6A illustrates a first part of a flowchart of an exemplary method in accordance with an embodiment of the present invention.
Figure 6B:
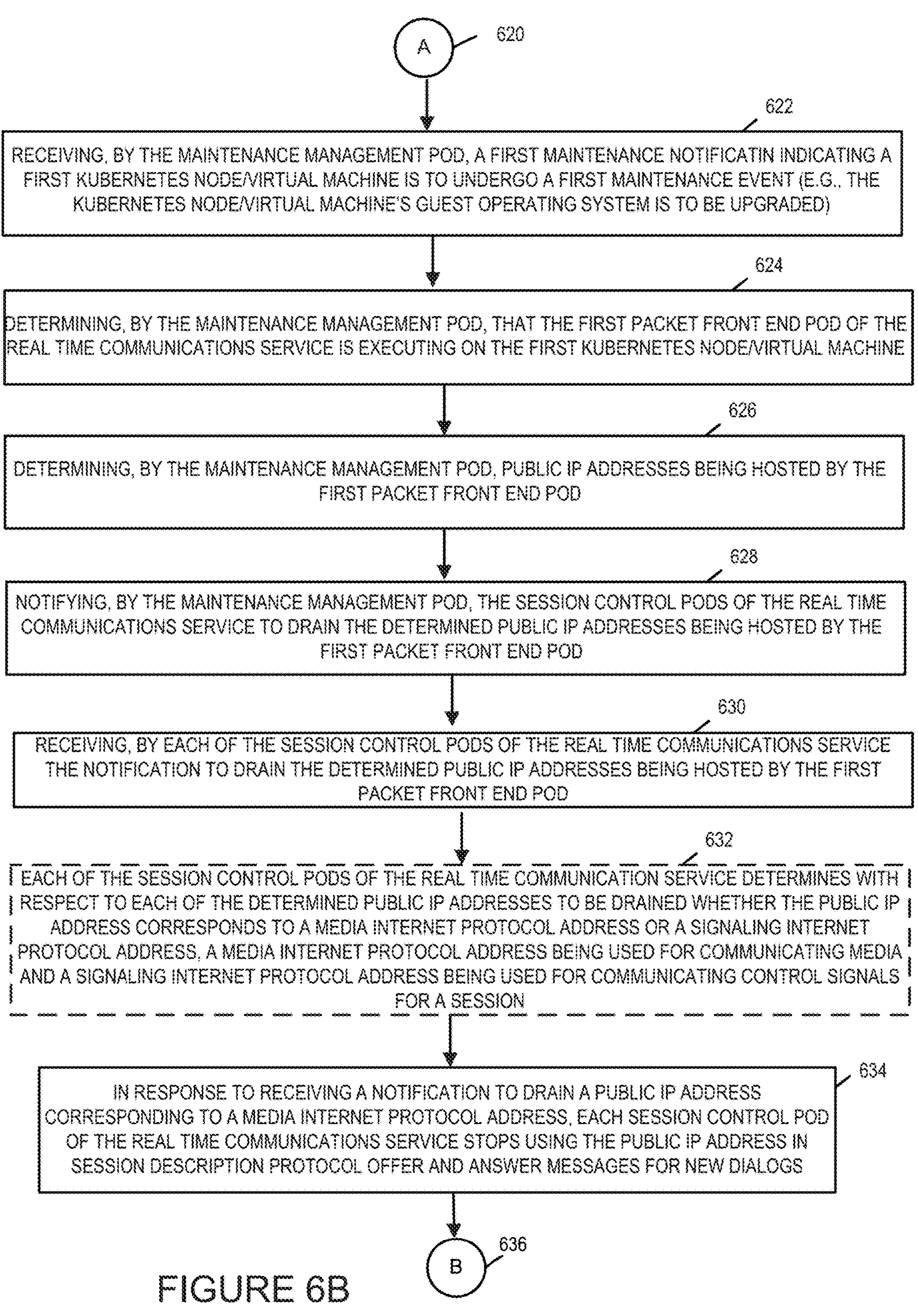
FIG. 6B illustrates a second part of a flowchart of an exemplary method in accordance with an embodiment of the present invention.
Figure 6C:
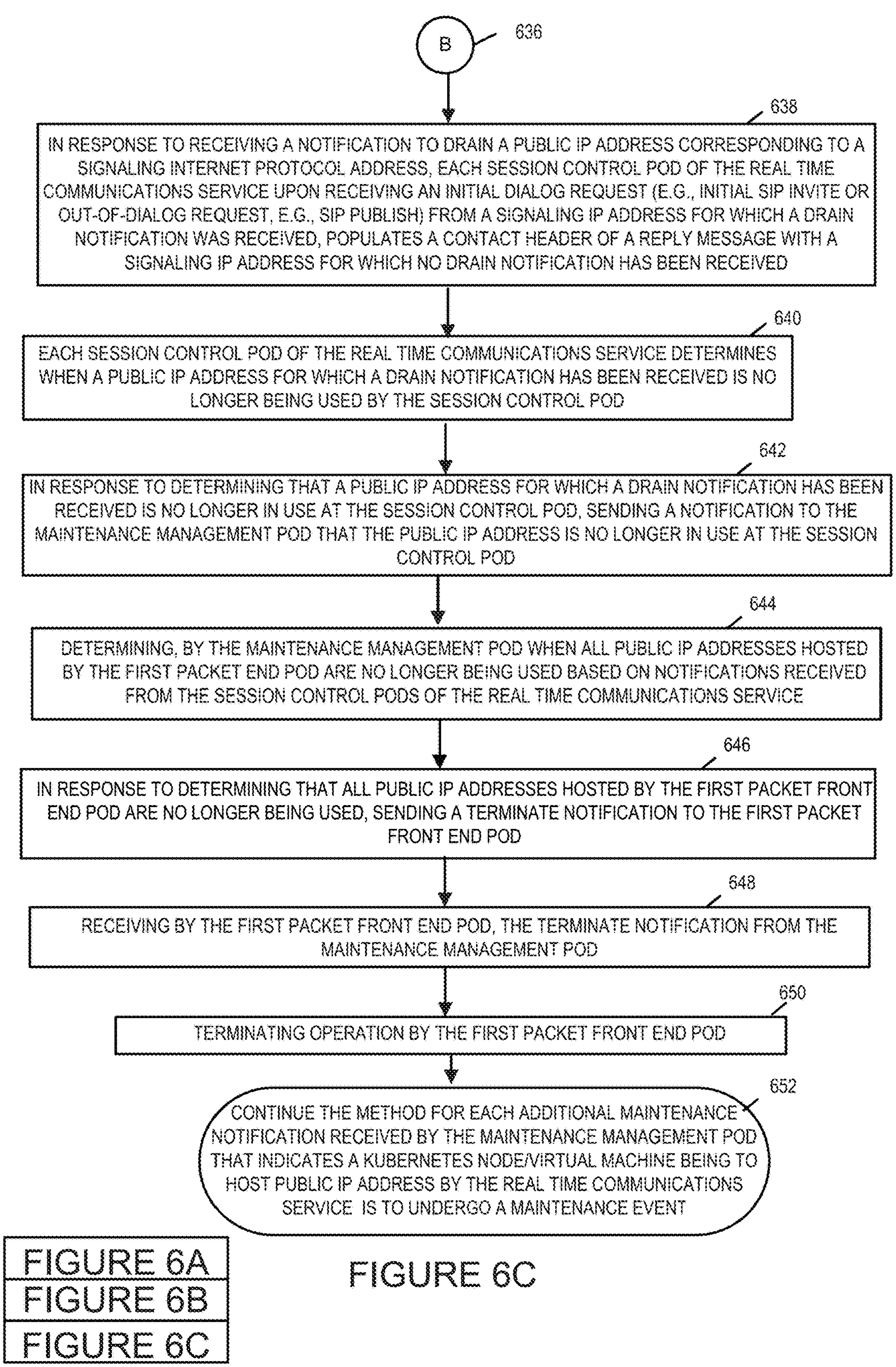
FIG. 6C illustrates a third part of a flowchart of an exemplary method in accordance with an embodiment of the present invention.

FIG. 6 comprises the combination of FIGS. 6A, 6B, and 6C. FIG. 6A illustrates a first part of a flowchart of an exemplary method in accordance with an embodiment of the present invention. FIG. 6B illustrates a second part of a flowchart of an exemplary method in accordance with an embodiment of the present invention. FIG. 6C illustrates a third part of a flowchart of an exemplary method in accordance with an embodiment of the present invention. The flowchart in FIG. 6 illustrates exemplary method 600 in accordance with an embodiment of the present invention. The exemplary method 600 may be, and in some embodiments is, implemented using the exemplary system 500 shown in FIG. 5. However, it should be understood that the method is not limited to a particular system or configuration.

Method 600 starts in step 602 shown on FIG. 6A. Operation proceeds from start step 602 to step 604.

In step 604, a real time communications service (e.g., a session border controller service) is created in a public cloud infrastructure system (e.g., public cloud infrastructure system 202' of system 500.) In some embodiments, step 604 includes one or more sub-steps 606, 608, 610, 612, 614, and 616.

In sub-step 606 a first Packet Front End Pod is instantiated on a first Kubernetes node/virtual machine. The first packet front end Pod is assigned a first set of public IP addresses to host. The first set of public IP addresses including at least one public IP address and typically a plurality of public IP addresses. (For example, PFE 1 Pod 282 of system 202' located on Kubernetes worker node/virtual machine 216').

In sub-step 608, a second packet Front End Pod on a second Kubernetes node/virtual machine is instantiated. The second Packet Front End Pod is assigned a second set of public IP addresses to host. The second set of public IP addresses including at least one public IP address and typically a plurality of public IP addresses. The first set of public IP addresses not including any of the public IP addresses in the second set of public IP addresses. (For example, PFE 2 Pod 283 of system 202' located on Kubernetes worker node/virtual machine 226'.)

In sub-step 610, a plurality of Session Control Pods are instantiated. At least some of said Session Control Pods are not located on the first Kubernetes node/virtual machine. For example, one or more of the plurality of Session Control Pods may be, and in some embodiments are located Kubernetes nodes/virtual machines which are different from the first Kubernetes node/virtual machine. (For example, as shown in system 202' in FIG. 3, Session Control 1 Pod 280 and Session Control 2 Pod 281 are located on Kubernetes worker node/virtual machine 210', Session Control 3 Pod 286 and Session Control 4 Pod 287 are located on the Kubernetes worker node/virtual machine 248'. Kubernetes worker node/virtual machine 210' and Kubernetes worker node/virtual machine 248' are different Kubernetes worker nodes/virtual machine than the Kubernetes worker node/virtual machine 216' on which the PFE 1 Pod 282 is located.) In various embodiments, the session control pods of the real time communications service perform one or more of the following: (i) session processing operations on SIP messages received from session load balancer pod(s) of the real time communications service and/or Packet Front End pods of the real time communications service, and (ii) media processing operations on media streams (e.g., transcoding operations).

In sub-step 612, a Session Load Balancer Pod is instantiated. The Session Load Balancer Pod is not located on the first Kubernetes node/virtual machine. (E.g., SLB 1 Pod 284 located on Kubernetes worker node/virtual machine 232' of system 202'). The session load balancer in various embodiments of the present invention distributes SIP messages received by the first Packet Front End Pod and the second Packet Front End Pod to the session control pods of the real time communications service for the Public Cloud infrastructure system.

In sub-step 614, a Maintenance Manager Pod is instantiated. The Maintenance Manager Pod is not located on the first Kubernetes node/virtual machine. (E.g., MM Pod 285 located on Kubernetes worker node/virtual machine 242' of system 202'.)

In sub-step 616, all of the public IP addresses used by the real time communications service to communicate with external entities outside the public cloud infrastructure system (e.g., user equipment device UE 1 262, . . . , UE X 264 and network equipment device NE 1 268, . . . , NE Y 270) are hosted on the First Packet Front End Pod and the second Packet Front End Pod. In such an embodiment, the first set of public IP addresses and the second set of public IP addresses are all the public IP addresses used by the real time communications service.

Operation proceeds from step 604 to step 618. In step 618, the Maintenance Management Pod of the real time communications service registers to receive notifications from a public cloud maintenance and management entity (e.g., public cloud maintenance and management entity 260 of system 202') for maintenance events scheduled for Pods, Kubernetes nodes/virtual machines and/or servers of the public cloud infrastructure system (e.g., Pods, Kubernetes nodes/virtual machines and/or servers of the public cloud infrastructure system on which application Pods (e.g., Pods 280, 281, 282, 283, 284, 285, 286 and 287) implementing the real time communications service are located). Operation proceeds from step 618 via connection node A 620 to step 622 shown on FIG. 6B.

In step 622, the maintenance management Pod receives a first maintenance notification (e.g., from the public cloud maintenance and management entity 260) indicating that the first Kubernetes node/virtual machine is to undergo a first maintenance event (e.g., the Kubernetes node/virtual machine's guest operating system (e.g., Guest OS 220 on Kubernetes node/virtual machine 216') is to be updated). Operation proceeds from step 622 to step 624.

In step 624, the maintenance management Pod determines that the first Packet Front End Pod of the real time communications system is executing on the first Kubernetes node/virtual machine. Operation proceeds from step 624 to step 626.

In step 626, the maintenance management Pod determines the public IP addresses being hosted by the first Packet Front End Pod which in this example are the first set of public IP addresses. Operation proceeds from step 626 to step 628.

In step 628, the maintenance management Pod notifies the Session Control Pods of the real time communications service to drain the determined public IP addresses being hosted by the first Packet Front End Pod. For example, the maintenance management Pod sends a message including a list of the determined public IP addresses being hosted by the first Packet Front End Pod to each of the Session Control Pods of the real time communication service with an instruction indicating the Session Control Pod are to drain all Internet Protocol (IP) addresses included in the list of public IP addresses. Operation proceeds from step 628 to step 630.

In step 630, each of the Session Control Pods of the real time communications service receives the notification to drain the determined public IP addresses being hosted by the first Packet Front End Pod. Operation proceeds from step 630 to optional step 632 or if the optional step 623 is not implemented directly to step 634.

In optional step 632, each of the Session Control Pods of the real time communications service determines with respect to each of the determined public IP addresses to be drained whether the public IP address corresponds to a media IP address or a signaling IP address. A media IP address being used for communicating media and a signaling IP address being used for communicating control signals for a session. Operation proceeds from step 632 to step 634.

In step 634, in response to receiving a notification to drain a public IP address corresponding to a media Internet Protocol address, each Session Control Pod of the real time communications service stops using the public IP address in session description protocol (SDP) offer and answer messages for new dialogs. When this step is implemented for the determined public IP addresses, each of the Session Control Pods will refrain from utilizing a determined public IP address in SDP offer and answer message for new dialogs and therefore no new media sessions will be established using the determined public IP addresses to be drained. In some embodiments, for each of the determined public IP addresses to be drained, each Session Control Pod will stop or cease using the public IP address in session description offer and answer messages for new dialogs regardless of whether the public IP address has been designated as a media IP address or a signaling IP address. Operation proceeds from step 634 via connection node B 636 to step 638.

In step 638, in response to receiving a notification to drain a public IP address corresponding to a signaling Internet Protocol address, each Session Control Pod of the real time communications service upon receiving an initial dialog request (e.g., initial SIP INVITE or out-of-dialog request, e.g., SIP Publish message) from a signaling IP address for which a drain notification was received, populates a Contact header (e.g., SIP Contact header field) of a reply message with a signaling IP address for which no drain notification has been received. In some embodiments, for each of the determined public IP addresses to be drained, each Session Control Pod upon receiving an initial dialog request (e.g., initial SIP INVITE or out-of-dialog request, e.g., SIP Publish message) from a public IP address for which a drain notification was received, populates a Contact header of a reply message with an IP address for which no drain notification has been received. Operation proceeds from step 638 to step 640.

In step 640, each Session Control Pod of the real time communications service determines when a public IP address for which a drain notification has been received is no longer being used by the Session Control Pod. Operation proceeds from step 640 to step 642.

In step 642, in response to determining that a public IP address, for which a drain notification has been received, is no longer in use at the Session Control Pod, sending a notification from the Session Control Pod to the Maintenance Management Pod that the public IP address is no longer in use at the Session Control Pod. This is done by each of the Session Control Pods which received the notification to drain public IP addresses. Operation proceeds from step 642 to step 644.

In step 644, the Maintenance Management Pod determines when all public IP addresses hosted by the first Packet End Pod are no longer being used based on notifications received from the Session Control Pods of the real time communications service. Operation proceeds from step 644 to step 646.

In step 646, in response to determining that all public IP addresses hosted by the first Packet Front End Pod are no longer being used, sending by the Maintenance Management Pod a terminate notification to the first Packet Front End Pod. Operation proceeds from step 646 to step 648.

In step 648, the first Packet Front End Pod receives the terminate notification from the Maintenance Management Pod. Operation proceeds from step 648 to step 650.

In step 650, the first Packet Front End Pod terminates operation. In this example when there are only two Packet Front End Pods (a first and a second Packet Front End Pod, the second Packet Front End Pod (e.g., PFE 2 POD) will now be hosting all public IP addresses for the real time communications service. In various embodiments, an additional Packet Front End Pod is instantiated to host public IP addresses either before or after the termination of the first Packet Front End Pod. The additional Packet Front End Pod is assigned a third set of public IP addresses to host for the real time communications service. The third set of public IP addresses having public IP address different than the first or second set of public IP addresses. The additional Packet Front End Pod executing on a Kubernetes node/virtual machine of the Public Cloud Infrastructure system which is different than the Kubernetes node/virtual machine on which the first Packet Front End Pod had been implemented on (e.g., on Kubernetes worker node/virtual machine 232' of system 202'). In some embodiments, after the first maintenance event has been completed, a third Packet Front End Pod for the real time service is instantiated on the first Kubernetes node/virtual machine (e.g., Kubernetes worker node/virtual machine 216'). The third Packet Front End Pod hosting the first set of public IP addresses or an additional set of public IP addresses not being hosted by another Packet Front End Pod of the real time communications service. Operation proceeds from step 650 to step 652.

In step 652, the method 600 continues for each additional notification received by the Maintenance Management Pod that indicates a Kubernetes node/virtual machine being used by a Pod of the real time communications service to one or more host public IP addresses is to undergo a maintenance event.

The method 600 provides a way for efficiently and effectively handing maintenance events in public cloud deployments which affect real time communications services so that there is minimal or no impact on the real time communications service (e.g., dropped and/or interrupted sessions caused by scheduled maintenance events are avoided).

In Kubernetes systems, Kubernetes nodes are either physical or virtual machines. In various embodiments, Kubernetes node/virtual machine is a Kubernetes node that is implemented as a virtual machine.

While the real time communications service in method 600 has been discussed as being implemented using a Kubernetes system, this is only exemplary as the method is applicable to other types of systems. For example, the method 600 may be, and in some embodiments is implemented on a Public Cloud infrastructure system in which the Pods (maintenance management pod, service control pods, the packet front end pods (e.g., first packet front end), session load balancer pod) are software applications (e.g., native applications), the Kubernetes node/virtual machine is a virtual machine executing on a server. Furthermore, the use of a limited number of elements is only exemplary. It should be understood that in the exemplary method 600 while only a single maintenance management Pod, session load balancer Pod, and a couple of Packet Front End pods are utilized to implement the real time communications service (e.g., SBC service) many additional Packet Front Ends, session load balancers, and maintenance management Pods may be, and typically are, used.

FIG. 7 as discussed above is a drawing illustrating an assembly of components 700 which may be included in the exemplary server 400 of FIG. 4. Assembly of components 700 can be, and in some embodiments is, used in server 400. The components in the assembly of components 700 can, and in some embodiments are, implemented fully in hardware within the processor 406, e.g., as individual circuits. The components in the assembly of components 400 can, and in some embodiments are, implemented fully in hardware within the assembly of components 419, e.g., as individual circuits corresponding to the different components. In other embodiments some of the components are implemented, e.g., as circuits, within the processor 406 with other components being implemented, e.g., as circuits within assembly of components 419, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 410 of the server 400, with the components controlling operation of server 400 to implement the functions corresponding to the components when the components are executed by a processor, e.g., processor 406. In some such embodiments, the assembly of components 700 is included in the memory 410 as assembly of components 418. In still other embodiments, various components in assembly of components 700 are implemented as a combination of hardware and software, e.g., with another circuit external to the processor providing input to the processor 406 which then under software control operates to perform a portion of a component's function. While shown in the FIG. 4 embodiment as a single processor, e.g., computer, it should be appreciated that the processor 406 may be implemented as one or more processors, e.g., computers or compute nodes.

When implemented in software the components include code, which when executed by the processor 406, configure the processor 406 to implement the function corresponding to the component. In embodiments where the assembly of components 700 is stored in the memory 410, the memory 410 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the server 400 or elements therein such as the processor 406, to perform the functions of corresponding steps illustrated and/or described in the methods described herein and in one or more of the flowchart 600, and/or described with respect to any of the Figures. Thus the assembly of components 700 includes various components that perform functions of corresponding steps of the method 600 illustrated in FIG. 6.

The exemplary assembly of components 700 includes the following components: a control routines component 702, a communications component 704, a determinator component 708, a hypervisor/host operating system/public cloud management component 710, one or more virtual machine components 712, one or more guest operating system components 714, a maintenance manager component 716, one or more service control component(s) 718, one or more packet front end component(s) 720, a session load balancing component 722, a public cloud maintenance management component 724, a storage component 726, a Kubernetes component 728, a public IP address drain component 730, and a termination component 732. Not all of the components identified need to be included in the assembly of components for each server. The components included in a server may be, and sometimes are, determined based on the function the server is to perform and/or the applications instantiated on the server. For example, if the server is to implement the public cloud maintenance management functions and/or operations of public cloud maintenance and management function 260 this component would be included but would not be included if the server was not providing this functionality. In some embodiments, all components are included but only those necessary for the specific tasks of the server are utilized. With the specific operations to be performed by the server controlled by the control routines component 702.

The control routines component 702 is configured to control the operation of the server. The communications component 704 is configured to provide communications functionality including communications signaling and support for various communications protocols and interfaces. The notification component 706 which generates, processes and/or responds to notifications or notification messages (e.g., registering for maintenance event notifications with the public cloud system, notification of maintenance events, notification of public IP addresses to be drained, notification of completion of draining public IP addresses, notification to terminate operations). In some embodiments, the notification component 706 is a sub-component of the communications component 704, the maintenance management component 716, the service control component(s) 718, the packet front end component(s) 720, and/or the public cloud maintenance management component 724. The determinator component 708 is configured to make determinations for the server. The determinations made are dependent on the applications executing on the server.

The hypervisor/host operating system/public cloud management component 710 is configured to provide a host operating system with a hypervisor which runs on top of the host operating system (OS) that creates one or more virtual machines and allocates hardware resources to the created virtual machines and ensures the virtual machines remain independent from one another. The hypervisor/host operating system/public cloud management component 710 is also configured to provide public cloud management services/functionality for the server such as implementing maintenance functions and/or routines for the server. In some embodiments, the hypervisor/host operating system/public cloud management component 710 implements Kubernetes worker node virtual machine(s) on the server.

The virtual machine component(s) 712 are configured to implement and operator as one or more separate independent virtual machines (e.g., Kubernetes worker node virtual machines) on the server.

The guest operating system component(s) 714 is configured to provide a separate operating system for each of the virtual machines implemented on server.

The maintenance manager component 716 is an application component which is part of a real time communications service (e.g., a SBC service) configured to provide the maintenance manager procedures as described above and in connection with the maintenance manager pod 285. Among, these procedures include monitoring the list of virtual machines used for applications, registering for maintenance event alerts to Public Cloud Infrastructure for all the virtual machines, nodes, and/or servers being used for a real time communications service, receiving Public Cloud maintenance event alerts and/or notifications, determining what virtual machines, applications, pods, servers, or nodes being utilized by a real time communication service will be affected by a particular maintenance event, determining if public IP addresses being utilized by the real time communications service will be affected by a maintenance event, notifying session control applications of the real time communications application of which public IP addresses need to be drained, receiving notifications from session control applications indicating that the session control application is no longer using a public IP address, determining when packet front end applications of a real time service are to be terminated, notifying packet front end applications of when to terminate operations, and notifying session control applications when notifications pertaining to draining public IP addresses are no longer valid.

The service control component(s) 718 are configured to provide all session processing on Session Initiation Protocol (SIP) messages and on media streams for a real time communications service (e.g., a SBC service). The service control component(s) 718 sends/receives SIP messages to/from Session Load Balancing application of a real time communications service. The service control component(s) 718 are also configured to implement the SC procedures/pseudocode described above an in connection with the session control applications/pods described in method 600 and system 500. Among the operations, the service control component(s) are further configured to implement are for each IP address (e.g., public IP address) for which a maintenance manager drain IP address notification is received, if the IP address is a media IP address then the session control application will not use the IP address in SDP messages for a session offer/answer pertaining to a new dialog. If/when all sessions under the control of the session controller component are terminated or there were no such sessions, the session controller component will notify the maintenance manager application component of the real time communications service that the IP address is no longer being used. If an IP address which is a signaling IP address is identified in a maintenance manager drain IP address notification received by the session control component, the session control component upon receiving an initial dialog request or an out-of-dialog request from the IP address populates the Contact header of the reply with a signaling IP address for which no draining notification has been received. If/when all dialogs using the IP address are terminated or if there were no such dialogs, the session control application component notifies the maintenance manager component of the real time communications service that the IP address is no longer being used.

The packet front end component(s) 720 are applications which are part of a real time communications service (e.g., SBC service) and are configured to act as the entry/exit point for all IP packets to/from external entities and the packet front end components are further configured to host the Public IP addresses used by the real time communications service. The public IP addresses of the real time communications service are distributed across several packet front end components 720 which are all part of the real time communications service. Each of the packet front end components 720 is configured to terminate operations in response to receiving a termination notification or instruction from the maintenance manager component of the real time communications service of which it is a part.

The session load balancing component 722 is an application which is part of a real time communications service (e.g., SBC service) and is configured to act as the entry/exit point for all SIP messages and distributes the SIP messages to session control components of the real time communications service. The Session Load Balancer component 722 sends/receives IP packets carrying the SIP messages to/from Packet Front End applications/components of a real time communications service.

The public cloud maintenance management component 726 is configured to implement the operations discussed in connection with public cloud maintenance and management entities 160 and 260. The public cloud maintenance management component 726 is configured to register maintenance manager applications/components of services, e.g., real time communications services, to receive notifications and/or alerts of upcoming public cloud maintenance events which will affect servers, Pods, virtual machines, and nodes (e.g., upgrading a server's host operating system or a virtual machine's guest operating system) and to provide notifications to maintenance manager applications/components of such maintenance events in advance of the maintenance events occurring.

The storage component 726 is configured to handle the storage and retrieval of information in and out of memory in the server and/or storage devices connected to the server.

The Kubernetes component 728 is configured to provide Kubernetes system applications and services when the system is Public Cloud system is implemented as a Kubernetes system or using a Kubernetes architecture such as implementing Kubernetes nodes/virtual machines and Kubelets on servers, and updating Kubernetes system components.

The Public IP address drain component 730 is configured to implement procedures to drain a public IP address. The Public IP address drain component 730 is sometimes a sub-component of the session control component(s) 718.

The termination component 732 is configured to terminate an application or component which is executing for example in response to a termination notification. In some embodiments, the termination component 732 is a sub-component of the packet front end component(s) 720.

Various embodiments of the present invention will now be discussed.

LISTING OF FIRST SET OF EXEMPLARY METHOD EMBODIMENTS

Method Embodiment 1. A method of implementing a real time communications service (e.g., a session border controller service) in a Public Cloud infrastructure system comprising: registering, by a maintenance management Pod of the real time communications service, to receive notifications from a Public Cloud maintenance and management entity for maintenance events scheduled for Pods, Kubernetes nodes/virtual machines or servers of the Public Cloud infrastructure system being used to implement the real time communications service, said Public Cloud maintenance and management entity managing the maintenance of Pods, Kubernetes nodes/virtual machine, and servers in the Public Cloud infrastructure system; receiving, by the maintenance management Pod, a first maintenance notification indicating a first Kubernetes node/virtual machine is to undergo a first maintenance event (e.g., the Kubernetes node/virtual machine's guest operating system is to be upgraded); determining, by the maintenance management Pod, a first Packet Front End Pod of the real time communications service executing on the first Kubernetes node/virtual machine; determining, by the maintenance management Pod, public IP addresses being hosted by the first Packet Front End pod; and notifying, by the maintenance management Pod, session control pods of the real time communications service to drain the determined public IP addresses being hosted by the first Packet Front End Pod.

Method Embodiment 2. The method of Method Embodiment 1, further comprising: in response to receiving a notification to drain a public IP address corresponding to a media Internet Protocol address, each session control pod of the real time communications service stops using the public IP address in Session Description Protocol offer and answer messages for new dialogs; and in response to receiving a notification to drain a public IP address corresponding to a signaling Internet Protocol address, each session control pod of the real time communications service upon receiving an initial dialog request (e.g., initial INVITE or out-of-dialog request, e.g., PUBLISH) from a signaling IP address for which a drain notification was received, populates a Contact header of a reply message with a signaling IP address for which no draining notification has been received.

Method Embodiment 3. The method of Method Embodiment 2, further comprising: each session control pod of the real time communications service determines when a public IP address for which a drain notification has been received is no longer being used by the session control pod; and in response to determining that a public IP address for which a drain notification has been received is no longer in use at the session control pod, sending a notification to the maintenance management pod that the public IP address is no longer in use at the session control pod.

Method Embodiment 4. The method of Method Embodiment 3, further comprising: determining by the maintenance management pod when all public IP addresses hosted by the first Packet Front End pod are no longer being used based on notifications from the session control pods of the real time communications service; and in response to determining that all public IP addresses hosted by the first Packet Front End pod are no longer being used, sending a terminate notification to the first Packet Front End pod.

Method Embodiment 5. The method of Method Embodiment 4, further comprising: receiving by the first Packet Front End pod, the terminate notification from the maintenance management pod; and terminating operation by the first Packet Front End pod.

Method Embodiment 6. The method of Method Embodiment 5, wherein the first maintenance notification is received a first amount of time before the first maintenance event (e.g., a sufficient amount of time before the first maintenance event to be able to drain the public IP addresses); wherein the public IP addresses hosted by the first Packet Front End pod are drained prior to the first maintenance event; and wherein draining the public IP addresses hosted by the first Packet Front End pod prior to the first maintenance event includes each of the session control pods of the real time communications service ceasing to use the public IP addresses hosted by the first Packet Front End pod.

Method Embodiment 7. The method of Method Embodiment 6, wherein the first amount of time is at least 20 minutes before the first maintenance event.

Method Embodiment 8. The method of Method Embodiment 6, further comprising: prior to receiving the first maintenance notification, creating the real time communications service (e.g., a Session Border Controller service) by: (i) instantiating the first Packet Front End Pod on the first Kubernetes node/virtual machine, said first Packet Front End Pod being assigned a first set of public IP addresses (e.g., a first plurality of Public IP addresses) to host; (ii) instantiating a second Packet Front End Pod on a second Kubernetes node/virtual machine, said second Packet Front End Pod being assigned a second set of public IP addresses (e.g., a second plurality of public IP addresses) to host, said first set of public IP addresses not including any of the public IP addresses in the second set of public IP addresses; (iii) instantiating a plurality of session control pods, at least some of said session control pods not being located on the first Kubernetes node/virtual machine; (iv) instantiating a session load balancer pod, said session load balancer pod not being located on the first Kubernetes node/virtual machine; and (v) instantiating said maintenance manager pod, said maintenance manager pod not being located on the first Kubernetes node/virtual machine; and wherein said first Packet Front End pod and said second Packet Front End pod host all public IP addresses used by the real time communications service to communicate with external entities; wherein the session load balancer distributes SIP messages received by the first Packet Front End pod and the second Packet Front End pod to the session control pods of the real time communications service of the Public Cloud infrastructure system; and wherein each of the session control pods of the real time communications service performs session processing operations on SIP messages received from the session load balancer pod; and wherein each of the session control pods of the real time communications service performs media processing operations on media streams.

Method Embodiment 9. The method of Method Embodiment 1, further comprising: in response to receiving the first maintenance notification indicating the first Kubernetes node/virtual machine is to undergo a first maintenance event, monitoring by the maintenance management pod the status of the first Packet Front End pod determined to being executing on the first Kubernetes node/virtual machine; and upon detecting that the first Packet Front end pod has terminated operation, notifying all session control pods of the real time communications service that notification pertaining to the public IP addresses hosted by the first Packet Front End pod are no longer valid.

Method Embodiment 10. The method of Method Embodiment 1, further comprising: in response to receiving the first maintenance notification indicating the first Kubernetes node/virtual machine is to undergo a first maintenance event, monitoring by the maintenance management pod the status of the first Kubernetes node/virtual machine; and upon detecting that the first Kubernetes node/virtual machine has terminated, notifying all session control pods of the real time communications service that notification pertaining to the public IP addresses hosted by the first Packet Front End pod are no longer valid.

Method Embodiment 11. The method of Method Embodiment 1, wherein the first maintenance event is one of the following: (i) a guest operating system update for a guest operating system executing on the first Kubernetes node, (ii) a host operating system update for an operating system executing on a first server on which the first Kubernetes node is located, (iii) an update to the hypervisor software on the first server on which the first Kubernetes node is located; (iv) a hardware update which will cause the first Packet Front End Pod to terminate (e.g., a hardware update or upgrade to the first server on which the first Kubernetes node is located); (v) an update to the Kubernetes system software for the first server or the first Kubernetes node; (vi) a driver update for the first sever, and (vii) an anticipated hardware failure.

Method Embodiment 12. The method of Method Embodiment 1, wherein the first maintenance event is an update to or maintenance to be performed on one or more of the following: a virtual machine, the first Kubernetes node, an operating system, or hardware which will cause the first Packet Front End Pod to terminate.

Method Embodiment 13. The method of Method Embodiment 1, wherein the first maintenance event is not an update to the application software for implementing the first Front End Pod of the real time communications service.

LISTING OF SECOND SET OF EXEMPLARY METHOD EMBODIMENTS

Method Embodiment 1. A method of implementing a real time communications service (e.g., a session border controller service) in a Public Cloud infrastructure system comprising: registering, by a maintenance management application of the real time communications service, to receive notifications from a Public Cloud maintenance and management entity for maintenance events scheduled for applications, virtual machines, or servers of the Public Cloud infrastructure system being used to implement the real time communications service, said Public Cloud maintenance and management entity managing the maintenance of applications, virtual machines, and servers in the Public Cloud infrastructure system; receiving, by the maintenance management application, a first maintenance notification indicating a first virtual machine is to undergo a first maintenance event (e.g., the virtual machine's guest operating system is to be upgraded); determining, by the maintenance management application, a first Packet Front End application of the real time communications service executing on the first virtual machine; determining, by the maintenance management application, public IP addresses being hosted by the first Packet Front End application; and notifying, by the maintenance management application, session control applications of the real time communications service to drain the determined public IP addresses being hosted by the first Packet Front End application.

Method Embodiment 2. The method of Method Embodiment 1, further comprising: in response to receiving a notification to drain a public IP address corresponding to a media Internet Protocol address, each session control application of the real time communications service stops using the public IP address in Session Description Protocol offer and answer messages for new dialogs; and in response to receiving a notification to drain a public IP address corresponding to a signaling Internet Protocol address, each session control application of the real time communications service upon receiving an initial dialog request (e.g., initial INVITE or out-of-dialog request, e.g., PUBLISH) from a signaling IP address for which a drain notification was received, populates a Contact header of a reply message with a signaling IP address for which no draining notification has been received.

Method Embodiment 3. The method of Method Embodiment 2, further comprising: each session control application of the real time communications service determines when a public IP address for which a drain notification has been received is no longer being used by the session control application; and in response to determining that a public IP address for which a drain notification has been received is no longer in use at the session control application, sending a notification to the maintenance management application that the public IP address is no longer in use at the session control application.

Method Embodiment 4. The method of Method Embodiment 3, further comprising: determining by the maintenance management application when all public IP addresses hosted by the first Packet Front End application are no longer being used based on notifications from the session control applications of the real time communications service; and in response to determining that all public IP addresses hosted by the first Packet Front End application are no longer being used, sending a terminate notification to the first Packet Front End application.

Method Embodiment 5. The method of Method Embodiment 4, further comprising: receiving by the first Packet Front End application, the terminate notification from the maintenance management application; and terminating operation by the first Packet Front End application.

Method Embodiment 6. The method of Method Embodiment 5, wherein the first maintenance notification is received a first amount of time before the first maintenance event (e.g., a sufficient amount of time before the first maintenance event to be able to drain the public IP addresses); wherein the public IP addresses hosted by the first Packet Front End application are drained prior to the first maintenance event; and wherein draining the public IP addresses hosted by the first Packet Front End application prior to the first maintenance event includes each of the session control applications of the real time communications service ceasing to use the public IP addresses hosted by the first Packet Front End application.

Method Embodiment 7. The method of Method Embodiment 6, wherein the first amount of time is at least 20 minutes before the first maintenance event.

Method Embodiment 8. The method of Method Embodiment 6, further comprising: prior to receiving the first maintenance notification, creating the real time communications service (e.g., a Session Border Controller service) by: (i) instantiating the first Packet Front End application on the first virtual machine, said first Packet Front End application being assigned a first set of public IP addresses (e.g., a first plurality of Public IP addresses) to host; (ii) instantiating a second Packet Front End application on a second virtual machine, said second Packet Front End application being assigned a second set of public IP addresses (e.g., a second plurality of public IP addresses) to host, said first set of public IP addresses not including any of the public IP addresses in the second set of public IP addresses; (iii) instantiating a plurality of session control applications, at least some of said session control applications not being located on the first virtual machine; (iv) instantiating a session load balancer application, said session load balancer application not being located on the first virtual machine; and (v) instantiating said maintenance manager application, said maintenance manager application not being located on the first virtual machine; and wherein said first Packet Front End application and said second Packet Front End application host all public IP addresses used by the real time communications service to communicate with external entities; wherein the session load balancer distributes SIP messages received by the first Packet Front End application and the second Packet Front End application to the session control applications of the real time communications service of the Public Cloud infrastructure system; and wherein each of the session control applications of the real time communications service performs session processing operations on SIP messages received from the session load balancer application; and wherein each of the session control applications of the real time communications service performs media processing operations on media streams.

Method Embodiment 9. The method of Method Embodiment 1, further comprising: in response to receiving the first maintenance notification indicating the first virtual machine is to undergo a first maintenance event, monitoring by the maintenance management application the status of the first Packet Front End application determined to being executing on the first virtual machine; and upon detecting that the first Packet Front end application has terminated operation, notifying all session control applications of the real time communications service that notification pertaining to the public IP addresses hosted by the first Packet Front End application are no longer valid.

Method Embodiment 9A. The method of Method Embodiment 1, further comprising: in response to receiving the first maintenance notification indicating a first virtual machine is to undergo a first maintenance event, monitoring by the maintenance management application the status of the first virtual machine; and upon detecting that the first virtual machine has terminated, notifying all session control applications of the real time communications service that notification pertaining to the public IP addresses hosted by the first Packet Front End application are no longer valid.

Method Embodiment 10. A method of implementing a communications service in a Public Cloud system comprising the steps of: (i) registering, by a Maintenance Management application of the communications service, to receive notifications for maintenance events scheduled for virtual machines and/or servers of the Public Cloud system being used to implement the communications service; (ii) receiving, by the Maintenance Management application, a maintenance notification indicating a first virtual machine is to undergo a maintenance event; (iii) determining, by the Maintenance Management application, public IP addresses being hosted by a first Packet Front End application executing on the first virtual machine; and notifying session control applications of the communications service to drain the determined public IP addresses being hosted by the first Packet Front End application.

Method Embodiment 11. The method of Method Embodiment 10, further comprising: in response to receiving a notification to drain a public IP address corresponding to a media Internet Protocol address, each session control application of the real time communications service stops using the public IP address in Session Description Protocol offer and answer messages for new dialogs; and in response to receiving a notification to drain a public IP address corresponding to a signaling Internet Protocol address, each session control application of the real time communications service upon receiving an initial dialog request (e.g., initial INVITE or out-of-dialog request, e.g., PUBLISH) from a signaling IP address for which a drain notification was received, populates a Contact header of a reply message with a signaling IP address for which no draining notification has been received.

Method Embodiment 12. The method of Method Embodiment 11, further comprising: each session control application of the real time communications service determines when a public IP address for which a drain notification has been received is no longer being used by the session control application; and in response to determining that a public IP address for which a drain notification has been received is no longer in use at the session control application, sending a notification to the maintenance management application that the public IP address is no longer in use at the session control application.

Method Embodiment 13. The method of Method Embodiment 12, further comprising: determining by the maintenance management application when all public IP addresses hosted by the first Packet Front End application are no longer being used based on notifications from the session control applications of the real time communications service; and in response to determining that all public IP addresses hosted by the first Packet Front End application are no longer being used, sending a terminate notification to the first Packet Front End application.

Method Embodiment 14. The method of Method Embodiment 13, further comprising: in response to receiving the termination notification at the first Packet Front End application, terminating by the first Packet Front End application its operations (e.g., performing an application termination operation in which the first Packet Front End application terminates and releases all resources).

Method Embodiment 15. The method of Method Embodiment 14, further comprising: in response to receiving the first maintenance notification indicating the first virtual machine is to undergo a first maintenance event, monitoring by the maintenance management application the status of the first Packet Front End application determined to being executing on the first virtual machine; and upon detecting that the first Packet Front End application has terminated operation, notifying all session control applications of the real time communications service that notification pertaining to the public IP addresses hosted by the first Packet Front End application are no longer valid.

Method Embodiment 16. A method of implementing a communications service in a Public Cloud system comprising the steps of: (i) registering, by a Maintenance Management application of the communications service, to receive notifications for maintenance events scheduled for virtual machines and/or servers of the Public Cloud system being used to implement the communications service (e.g., virtual machines and/or servers with one or more applications (e.g., Packet Front End applications) which host public IP addresses); (ii) receiving, by the Maintenance Management application, a maintenance notification indicating one or more of the one or more virtual machines and/or servers are to undergo a maintenance event; (iii) determining, by the Maintenance Management application, public IP addresses being hosted by applications of the communications service executing on the one or more virtual machines and/or servers which are to undergo a maintenance event; and notifying session control applications of the communications service to drain the determined public IP addresses being hosted by the applications of the communications service executing on the one or more virtual machines and/or servers, said notification including a list of the determined public IP addresses to be drained.

Method Embodiment 17. The method of Method Embodiment 16 further comprising: performing by each of the session control applications that receive the notification to drain the determined public IP addresses, draining operations with respect to each of the determined public IP addresses; and generating, by each of the session control applications a notification message when one or more of the public IP addresses has been drained by the session control application indicating the one or more public IP addresses for which the draining operation has been completed; and communicating the generated notification message to the maintenance management application.

Method Embodiment 18. The method of Method Embodiments 1-17, wherein each of the applications is a cloud native application (e.g., session control applications, maintenance management application(s), Packet Front End application(s), Session Load Balancer application(s) are cloud native applications) developed to execute on the guest operating system of the virtual machine on which it is executing.

Method Embodiment 19. The method of Method Embodiments 1-17, wherein the Public Cloud Infrastructure System is implemented as a Kubernetes system; wherein the virtual machines are Kubernetes worker nodes; wherein each of the applications is a Kubernetes Pod (e.g., session control applications, maintenance management application(s), Packet Front End application(s), Session Load Balancer application(s) are Kubernetes Pods).

Method Embodiment 20. The method of Method Embodiment 19, wherein one or more of the servers of the Public Cloud Infrastructure System are hardware servers or compute nodes including one or more processors and memory.

Method Embodiment 21. The method of Method Embodiments 1-20, wherein the first maintenance event is one of the following: (i) a guest operating system update for a guest operating system executing on the first Kubernetes node, (ii) a host operating system update for an operating system executing on a first server on which the first Kubernetes node is located, (iv) an update to the hypervisor software on the first server on which the first Kubernetes node is located; (v) a hardware update which will cause the first Packet Front End Pod to terminate (e.g., a hardware update or upgrade to the first server on which the first Kubernetes node is located); (vi) an update to the Kubernetes system software for the first server or the first Kubernetes node; (vii) a driver update for the first sever, and (viii) an anticipated hardware failure.

Method Embodiment 22. The method of Method Embodiment 1-20, wherein the first maintenance event is an update to or maintenance to be performed on one or more of the following: a virtual machine, the first Kubernetes node, an operating system, or hardware which will cause the first Packet Front End Pod to terminate.

Method Embodiment 23. The method of Method Embodiment 21 or 22, wherein the first maintenance event is not an update to the application software for implementing the first Front End Pod of the real time communications service.

LISTING OF SET OF EXEMPLARY SYSTEM EMBODIMENTS

System Embodiment 1. A Public Cloud infrastructure system comprising: a plurality of servers, said plurality of servers including a first server on which a first Kubernetes node is implemented as a first virtual machine, a maintenance management Pod of a real time communications service (e.g., a session border controller service) executing on the first Kubernetes node, said maintenance management Pod performing the following operations: registering to receive notifications from a Public Cloud maintenance and management entity for maintenance events scheduled for Pods, Kubernetes nodes or servers of the Public Cloud infrastructure system being used to implement the real time communications service, said Public Cloud maintenance and management entity managing the maintenance of Pods, Kubernetes nodes, and servers in the Public Cloud infrastructure system; receiving a first maintenance notification indicating a second Kubernetes node which is implemented as a second virtual machine located on a second server of the plurality of servers is to undergo a first maintenance event (e.g., the Kubernetes node/virtual machine's guest operating system is to be upgraded); determining a first Packet Front End pod of the real time communications service is executing on the second Kubernetes node; determining public IP addresses being hosted by the first Packet Front End pod; and notifying session control pods of the real time communications service to drain the determined public IP addresses being hosted by the first Packet Front End pod.

System Embodiment 2. The system of System Embodiment 1, wherein the session control pods of the real time communications service are located on one or more servers of the plurality of servers which are different from the second server.

System Embodiment 3. The system of System Embodiment 1, wherein in response to receiving a notification to drain a public IP address corresponding to a media Internet Protocol address, each session control pod of the real time communications service stops using the public IP address in Session Description Protocol offer and answer messages for new dialogs; and wherein in response to receiving a notification to drain a public IP address corresponding to a signaling Internet Protocol address, each session control pod of the real time communications service upon receiving an initial dialog request (e.g., initial INVITE or out-of-dialog request, e.g., PUBLISH) from a signaling IP address for which a drain notification was received, populates a Contact header of a reply message with a signaling IP address for which no draining notification has been received.

System Embodiment 4. The system of System Embodiment 3, wherein each session control pod of the real time communications service determines when a public IP address for which a drain notification has been received is no longer being used by the session control pod; and in response to determining that a public IP address for which a drain notification has been received is no longer in use at the session control pod, the session control pod sends a notification to the maintenance management pod that the public IP address is no longer in use at the session control pod.

System Embodiment 5. The system of System Embodiment 4, wherein the maintenance management pod determines when all public IP addresses hosted by the first Packet Front End pod are no longer being used based on notifications received from the session control pods of the real time communications service; and in response to determining that all public IP addresses hosted by the first Packet Front End pod are no longer being used, the maintenance management pod sends a terminate notification to the first Packet Front End pod.

System Embodiment 6. The system of System Embodiment 5, wherein the first Packet Front End pod in response to receiving the terminate notification from the maintenance management pod terminates operation.

System Embodiment 7. The system of System Embodiment 6, wherein the first maintenance notification is received a first amount of time before the first maintenance event (e.g., a sufficient amount of time before the first maintenance event to be able to drain the public IP addresses); wherein the public IP addresses hosted by the first Packet Front End pod are drained prior to the first maintenance event; and wherein draining the public IP addresses hosted by the first Packet Front End pod prior to the first maintenance event includes each of the session control pods of the real time communications service ceasing to use the public IP addresses hosted by the first Packet Front End pod.

System Embodiment 8. The system of System Embodiment 7, wherein the first amount of time is at least 20 minutes before the first maintenance event.

System Embodiment 9. The system of System Embodiment 7, wherein prior to receiving the first maintenance notification, the Public Infrastructure System creates the real time communications service (e.g., a Session Border Controller service) by performing the following operations: (i) instantiating the first Packet Front End Pod on the second Kubernetes node of the second server, said first Packet Front End Pod being assigned a first set of public IP addresses (e.g., a first plurality of Public IP addresses) to host; (ii) instantiating a second Packet Front End Pod on a third Kubernetes node which is implemented as a third virtual machine on a third server, said second Packet Front End Pod being assigned a second set of public IP addresses (e.g., a second plurality of public IP addresses) to host, said first set of public IP addresses not including any of the public IP addresses in the second set of public IP addresses; (iii) instantiating a plurality of session control pods, at least some of said session control pods not being located on the second server; (iv) instantiating a session load balancer pod, said session load balancer pod not being located on the second server; and (v) instantiating said maintenance manager pod on said first virtual machine of said first server; and wherein said first Packet Front End pod and said second Packet Front End pod host all public IP addresses used by the real time communications service to communicate with external entities; wherein the session load balancer distributes SIP messages received by the first Packet Front End pod and the second Packet Front End pod to the session control pods of the real time communications service of the Public Cloud infrastructure system; and wherein each of the session control pods of the real time communications service performs session processing operations on SIP messages received from the session load balancer pod; and wherein each of the session control pods of the real time communications service performs media processing operations on media streams.

System Embodiment 10. The system of System Embodiment 1, wherein in response to receiving the first maintenance notification indicating the second Kubernetes node is to undergo a first maintenance event, the maintenance management pod monitors the status of the first Packet Front End pod determined to being executing on the second Kubernetes node; and wherein the maintenance management pod upon detecting that the first Packet Front End pod has terminated operation notifies all session control pods of the real time communications service that notifications pertaining to the public IP addresses hosted by the first Packet Front End pod are no longer valid.

System Embodiment 11. The System Embodiment of System Embodiment 1, wherein the first maintenance event is one of the following: (i) a guest operating system update for a guest operating system executing on the second Kubernetes node, (ii) a host operating system update for an operating system executing on a second server on which the second Kubernetes node is located, (iii) an update to the hypervisor software on the second server on which the second Kubernetes node is located; (iv) a hardware update which will cause the first Packet Front End Pod to terminate (e.g., a hardware update to the second server on which the first Kubernetes node is located); (v) an update to the Kubernetes system software for the second server or the second Kubernetes node.

System Embodiment 12. The system of System Embodiment 1, wherein the first maintenance event is an update to or maintenance to be performed on one or more of the following which will cause the first Packet Front End Pod to terminate: a virtual machine, the first Kubernetes node, an operating system, or hardware.

System Embodiment 13. The system of System Embodiment 1, wherein the first maintenance event is not an update to the application software for implementing the first Front End Pod of the real time communications service.

System Embodiment 14. The system of System Embodiments 1-13, wherein each server of the plurality of servers includes one or more processors and memory; wherein each of the one or more processors control the server in which they are located to execute software including operating system software and applications on the hardware of the server (e.g., hypervisor/host operating system/cloud management, guest operating system Kubernetes nodes, virtual machines, pods (e.g., maintenance management pod, session control pods, session load balancer pod, packet front end pods)).

System Embodiment 15. A Public Cloud infrastructure system comprising: a plurality of servers, said plurality of servers including a first server including memory and a first processor on which a first virtual machine is executing, a maintenance management application of a real time communications service (e.g., a session border controller service) executing on the first virtual machine, said maintenance management application performing the following operations: registering to receive notifications from a Public Cloud maintenance and management entity for maintenance events scheduled for applications, virtual machines or servers of the Public Cloud infrastructure system being used to implement the real time communications service, said Public Cloud maintenance and management entity managing the maintenance of applications, virtual machines, and servers in the Public Cloud infrastructure system; receiving a first maintenance notification indicating a second virtual machine located on a second server of the plurality of servers is to undergo a first maintenance event (e.g., the virtual machine's guest operating system is to be upgraded); determining a first Packet Front End application of the real time communications service is executing on the second virtual machine; determining public IP addresses being hosted by the first Packet Front End application; and notifying session control applications of the real time communications service to drain the determined public IP addresses being hosted by the first Packet Front End application.

LISTING OF SET OF EXEMPLARY NON-TRANSITORY MACHINE READABLE MEDIUM EMBODIMENTS

Non-transitory Machine Readable Medium 1. A non-transitory machine readable medium including a first set of executable instructions forming a maintenance management application or Pod of a real time communications service which when executed by a processor of a first server in a Public Cloud Infrastructure system cause the first server to perform the following operations: registering to receive notifications from the Public Cloud maintenance and management entity for maintenance events scheduled for Pods, Kubernetes nodes or servers of a Public Cloud infrastructure system being used to implement the real time communications service, said Public Cloud maintenance and management entity managing the maintenance of Pods, Kubernetes nodes, and servers in the Public Cloud infrastructure system; receiving a first maintenance notification indicating a first Kubernetes node which is implemented as a first virtual machine located on a second server in the Public Cloud infrastructure system is to undergo a first maintenance event (e.g., the Kubernetes node/virtual machine's guest operating system is to be upgraded); determining a first Packet Front End pod of the real time communications service is executing on the second Kubernetes node; determining public IP addresses being hosted by the first Packet Front End pod; and notifying session control pods of the real time communications service to drain the determined public IP addresses being hosted by the first Packet Front End pod.

Non-transitory Machine Readable Medium 1. A non-transitory machine readable medium including a first set of executable instructions forming a maintenance management application of a real time communications service which when executed by a processor of a first server in a Public Cloud Infrastructure system cause the first server to perform the following operations: registering to receive notifications from the Public Cloud maintenance and management entity for maintenance events scheduled for applications, virtual machines or servers of a Public Cloud infrastructure system being used to implement the real time communications service, said Public Cloud maintenance and management entity managing the maintenance of applications, virtual machines, and servers in the Public Cloud infrastructure system; receiving a first maintenance notification indicating a first virtual machine located on a second server in the Public Cloud infrastructure system is to undergo a first maintenance event (e.g., virtual machine's guest operating system is to be upgraded); determining a first Packet Front End application of the real time communications service is executing on the first virtual machine on the second server; determining public IP addresses being hosted by the first Packet Front End application; and notifying session control applications of the real time communications service to drain the determined public IP addresses being hosted by the first Packet Front End application.

The techniques of various embodiments may be implemented using software, hardware and/or a combination of software and hardware. Various embodiments are directed to apparatus, e.g., servers implementing virtual machines on which real time applications and/or services such as session border controllers are implemented. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., real time communications device, session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controller. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a session border controller with a processor which includes a component corresponding to each of the steps of the various described methods performed by the device in which the processor is included. In some but not all embodiments a device, e.g., communications node such as a session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of implementing a real time communications service comprising:

receiving, by a maintenance management application of a real time communications service, a first maintenance notification indicating a first virtual machine is to undergo a first maintenance event;

determining, by the maintenance management application, a first Packet Front End application of the real time communications service executing on the first virtual machine;

determining, by the maintenance management application, public Internet Protocol (IP) addresses being hosted by the first Packet Front End application;

notifying, by the maintenance management application, session control applications of the real time communications service to drain the determined public IP addresses being hosted by the first Packet Front End application;

in response to receiving a notification to drain a public IP address corresponding to a media IP address, each session control application of the real time communications service stops using the public IP address in Session Description Protocol offer and answer messages for new dialogs; and in response to receiving a notification to drain a public IP address corresponding to a signaling IP address, each session control application of the real time communications service upon receiving an initial dialog request from a signaling IP address for which a drain notification was received, populates a Contact header of a reply message with a signaling IP address for which no draining notification has been received.

2. The method of claim 1, further comprising:

determining, by each session control application of the real time communications service, when a public IP address for which a drain notification has been received is no longer being used by the session control application; and in response to determining that a public IP address for which a drain notification has been received is no longer in use at the session control application, sending a notification to the maintenance management application that the public IP address is no longer in use at the session control application.

3. The method of claim 2, further comprising:

determining, by the maintenance management application, when all public IP addresses hosted by the first Packet Front End application are no longer being used based on notifications from the session control applications of the real time communications service; and in response to determining that all public IP addresses hosted by the first Packet Front End application are no longer being used, sending a terminate notification to the first Packet Front End application.

4. The method of claim 3, further comprising:

receiving, by the first Packet Front End application, the terminate notification from the maintenance management application; and terminating operation by the first Packet Front End application.

5. The method of claim 4, wherein the first maintenance notification is received a first amount of time before the first maintenance event;

wherein the public IP addresses hosted by the first Packet Front End application are drained prior to the first maintenance event; and wherein draining the public IP addresses hosted by the first Packet Front End application prior to the first maintenance event includes each of the session control applications of the real time communications service ceasing to use the public IP addresses hosted by the first Packet Front End application.

6. The method of claim 5, wherein the first amount of time is at least 20 minutes before the first maintenance event.

7. The method of claim 5, further comprising:

prior to receiving the first maintenance notification, creating the real time communications service by:

(i) instantiating the first Packet Front End application on the first virtual machine, said first Packet Front End application being assigned a first set of public IP addresses to host;

(ii) instantiating a second Packet Front End application on a second virtual machine, said second Packet Front End application being assigned a second set of public IP addresses to host, said first set of public IP addresses not including any of the public IP addresses in the second set of public IP addresses;

(iii) instantiating a plurality of session control applications, at least some of said session control applications not being located on the first virtual machine;

(iv) instantiating a session load balancer application, said session load balancer application not being located on the first virtual machine; and (v) instantiating said maintenance management application, said maintenance management application not being located on the first virtual machine; and wherein said first Packet Front End application and said second Packet Front End application host all public IP addresses used by the real time communications service to communicate with external entities; and wherein the session load balancer application distributes Session Initiation Protocol (SIP) messages received by the first Packet Front End application and the second Packet Front End application to the session control applications of the real time communications service; and wherein each of the session control applications of the real time communications service performs session processing operations on SIP messages received from the session load balancer application; and wherein each of the session control applications of the real time communications service performs media processing operations on media streams.

8. The method of claim 1, further comprising:

in response to receiving the first maintenance notification indicating a first virtual machine is to undergo a first maintenance event, monitoring by the maintenance management application the status of the first virtual machine; and upon detecting that the first virtual machine has terminated, notifying all session control applications of the real time communications service that notifications pertaining to the public IP addresses hosted by the first Packet Front End application are no longer valid.

9. The method of claim 1, wherein the first maintenance event is one of the following: (i) a guest operating system update for a guest operating system executing on the first virtual machine, (ii) a host operating system update for an operating system executing on a first server on which the first virtual machine is located, (iii) an update to hypervisor software on the first server on which the first virtual machine is located, (iv) a hardware update which will cause the first Packet Front End application to terminate, (v) an update to software for the first server on which the first virtual machine is located, (vi) a driver update for the first server on which the first virtual machine is located, and (vii) an anticipated hardware failure.

10. The method of claim 1, wherein the first maintenance event is maintenance to be performed on one or more of the following: software or hardware which will cause the first Packet Front End application to terminate.

11. A method of implementing a real time communications service comprising:

receiving, by a maintenance management application of a real time communications service, a first maintenance notification indicating a first virtual machine is to undergo a first maintenance event;

determining, by the maintenance management application, a first Packet Front End application of the real time communications service executing on the first virtual machine;

determining, by the maintenance management application, public Internet Protocol (IP) addresses being hosted by the first Packet Front End application;

notifying, by the maintenance management application, session control applications of the real time communications service to drain the determined public IP addresses being hosted by the first Packet Front End application;

in response to receiving the first maintenance notification indicating the first virtual machine is to undergo a first maintenance event, monitoring by the maintenance management application, the status of the first Packet Front End application determined to being executing on the first virtual machine; and upon detecting that the first Packet Front end application has terminated operation, notifying all session control applications of the real time communications service that notifications pertaining to the public IP addresses hosted by the first Packet Front End application are no longer valid.

12. A Public Cloud system comprising:

a plurality of servers, said plurality of servers including a first server on which a first virtual machine is implemented, a maintenance management application of a real time communications service executing on the first virtual machine, said maintenance management application performing the following operations:

receiving, from a Public Cloud maintenance and management entity of the Public Cloud system, a first maintenance notification indicating a second virtual machine located on a second server of the plurality of servers is to undergo a first maintenance event, said Public Cloud system being used to implement the real time communications service, said Public Cloud maintenance and management entity managing the maintenance of applications, virtual machines, and servers in the Public Cloud system;

determining a first Packet Front End application of the real time communications service is executing on the second virtual machine;

determining public Internet Protocol (IP) addresses being hosted by the first Packet Front End application; and notifying session control applications of the real time communications service to drain the determined public IP addresses being hosted by the first Packet Front End application;

wherein in response to receiving a notification to drain a public IP address corresponding to a media IP address, each session control application of the real time communications service stops using the public IP address in Session Description Protocol offer and answer messages for new dialogs; and wherein in response to receiving a notification to drain a public IP address corresponding to a signaling IP address, each session control application of the real time communications service upon receiving an initial dialog request from a signaling IP address for which a drain notification was received, populates a Contact header of a reply message with a signaling IP address for which no draining notification has been received.

13. The Public Cloud system of claim 12, wherein the session control applications of the real time communications service are located on one or more servers of the plurality of servers which are different from the second server.

14. The Public Cloud system of claim 12, wherein each session control application of the real time communications service determines when a public IP address for which a drain notification has been received is no longer being used by the session control application; and in response to determining that a public IP address for which a drain notification has been received is no longer in use at the session control application, the session control application sends a notification to the maintenance management application that the public IP address is no longer in use at the session control application.

15. The Public Cloud system of claim 14, wherein the maintenance management application determines when all public IP addresses hosted by the first Packet Front End application are no longer being used based on notifications received from the session control applications of the real time communications service; and in response to determining that all public IP addresses hosted by the first Packet Front End application are no longer being used, the maintenance management application sends a terminate notification to the first Packet Front End application.

16. The Public Cloud system of claim 15, wherein the first Packet Front End application in response to receiving the terminate notification from the maintenance management application terminates operation.

17. The Public Cloud system of claim 16, wherein prior to receiving the first maintenance notification, the Public Cloud system creates the real time communications service by performing the following operations:

(i) instantiating the first Packet Front End application on the second virtual machine of the second server, said first Packet Front End application being assigned a first set of public IP addresses to host;

(ii) instantiating a second Packet Front End application on a third virtual machine on a third server of the plurality of servers, said second Packet Front End application being assigned a second set of public IP addresses to host, said first set of public IP addresses not including any of the public IP addresses in the second set of public IP addresses;

(iii) instantiating a plurality of session control applications, at least some of said session control applications not being located on the second server;

(iv) instantiating a session load balancer application, said session load balancer application not being located on the second server; and (v) instantiating said maintenance manager application on said first virtual machine of said first server; and wherein said first Packet Front End application and said second Packet Front End application host all public IP addresses used by the real time communications service to communicate with external entities;

wherein the session load balancer application distributes Session Initiation Protocol (SIP) messages received by the first Packet Front End application and the second Packet Front End application to the session control applications of the real time communications service of the Public Cloud system; and wherein each of the session control applications of the real time communications service performs session processing operations on SIP messages received from the session load balancer application; and wherein each of the session control applications of the real time communications service performs media processing operations on media streams.

18. The Public Cloud system of claim 12, wherein the first maintenance event is one of the following: (i) a guest operating system update for a guest operating system executing on the second virtual machine, (ii) a host operating system update for an operating system executing on the second server on which the second virtual machine is located, (iii) an update to hypervisor software on the second server on which the second virtual machine is located, (iv) a hardware update which will cause the first Packet Front End application to terminate, (v) an update to software for the second server on which the second virtual machine is located, (vi) a driver update for the second server on which the second virtual machine is located, and (vii) an anticipated hardware failure.

19. A non-transitory machine readable medium including a first set of executable instructions forming a maintenance management application of a real time communications service which when executed by a processor of a first server in a Public Cloud system cause the first server to perform the following operations:

receiving, from a Public Cloud maintenance and management entity of the Public Cloud system, a first maintenance notification indicating a first virtual machine located on a second server in the Public Cloud system is to undergo a first maintenance event, said Public Cloud system being used to implement the real time communications service, said Public Cloud maintenance and management entity managing the maintenance of applications, virtual machines, and servers of the Public Cloud system;

determining a first Packet Front End application of the real time communications service is executing on the first virtual machine;

determining public Internet Protocol (IP) addresses being hosted by the first Packet Front End application;

notifying session control applications of the real time communications service to drain the determined public IP addresses being hosted by the first Packet Front End application;

in response to receiving the first maintenance notification indicating the first virtual machine is to undergo a first maintenance event, monitoring by the maintenance management application, the status of the first Packet Front End application determined to being executing on the first virtual machine; and upon detecting that the first Packet Front end application has terminated operation, notifying all session control applications of the real time communications service that notifications pertaining to the public IP addresses hosted by the first Packet Front End application are no longer valid.

20. A Public Cloud system comprising:

a plurality of servers, said plurality of servers including a first server on which a first virtual machine is implemented, a maintenance management application of a real time communications service executing on the first virtual machine, said maintenance management application performing the following operations:

receiving, from a Public Cloud maintenance and management entity of the Public Cloud system, a first maintenance notification indicating a second virtual machine located on a second server of the plurality of servers is to undergo a first maintenance event, said Public Cloud system being used to implement the real time communications service, said Public Cloud maintenance and management entity managing the maintenance of applications, virtual machines, and servers in the Public Cloud system;

determining a first Packet Front End application of the real time communications service is executing on the second virtual machine;

determining public Internet Protocol (IP) addresses being hosted by the first Packet Front End application;

notifying session control applications of the real time communications service to drain the determined public IP addresses being hosted by the first Packet Front End application;

in response to receiving the first maintenance notification indicating the second virtual machine is to undergo a first maintenance event, monitoring by the maintenance management application, the status of the first Packet Front End application determined to being executing on the second virtual machine; and upon detecting that the first Packet Front end application has terminated operation, notifying all session control applications of the real time communications service that notifications pertaining to the public IP addresses hosted by the first Packet Front End application are no longer valid.

* * * * *